United States Patent
Capper et al.

(10) Patent No.: US 10,892,991 B2
(45) Date of Patent: Jan. 12, 2021

(54) RESILIENT HASHING WITH MULTIPLE HASHES

(71) Applicant: Arista Networks, Inc., Santa Clara, CA (US)

(72) Inventors: Simon Capper, San Jose, CA (US); Prashanth Krishnamurthy, San Jose, CA (US); Tula Kraiser, Sunnyvale, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 16/294,851

(22) Filed: Mar. 6, 2019

(65) Prior Publication Data
US 2020/0287830 A1     Sep. 10, 2020

(51) Int. Cl.
*H04L 12/743*     (2013.01)
*G06F 8/71*     (2018.01)
(Continued)

(52) U.S. Cl.
CPC ............ *H04L 45/7453* (2013.01); *G06F 8/71* (2013.01); *H04L 61/2007* (2013.01); *H04L 67/1002* (2013.01)

(58) Field of Classification Search
CPC . H04L 45/7453; H04L 67/42; H04L 61/2007; H04L 67/1002; H04L 67/1023; H04L 12/26; H04L 9/28; H04L 67/1004; H04L 47/125; H04L 67/1008; H04L 45/46; H04L 45/56; H04L 45/54; H04L 67/1036;
(Continued)

(56) References Cited

U.S. PATENT DOCUMENTS 6,067,547 A     5/2000   Douceur
7,355,977 B1    4/2008   Li
(Continued)

OTHER PUBLICATIONS

Olteanu et al.: "Stateless Datacenter Load-balancing with Beamer"; Proceedings of the 15th USENIX Symposium on Networked Systems Design and Implementation (NSDI '18); Apr. 9-11, 2018; Renton, WA, USA; 16 pages.
(Continued)

*Primary Examiner* — Chi H Pham
*Assistant Examiner* — Ji-Hae Yea
(74) *Attorney, Agent, or Firm* — Fountainhead Law Group P.C.

(57) ABSTRACT

Techniques for implementing resilient hashing with multiple hashes are provided. In one set of embodiments, a network device can maintain a first hash table comprising mappings between a first set of hash indices and a set of bit values. The network device can also maintain a second hash table comprising mappings between a second set of hash indices and active next-hop destinations. Upon receiving a network packet, the network device can compute a first hash and can match the first hash value to a first mapping in the first hash table based on the first mapping's hash index. When the first mapping's bit value indicates that the first mapping's hash index corresponds to an active next-hop destination, the network device can further match the first hash value to a second mapping in the second hash table and send the network packet to the second mapping's active next-hop destination.

20 Claims, 14 Drawing Sheets

(51) Int. Cl.
  *H04L 29/08* (2006.01)
  *H04L 29/12* (2006.01)
(58) Field of Classification Search
  CPC ....... H04L 45/245; H04L 45/745; G06F 8/71; G06F 17/30; G06F 15/16; G06F 12/1009; G06F 12/0238; G06F 2212/202; G06F 2212/1044; H01M 4/94
  See application file for complete search history.

(56) References Cited

U.S. PATENT DOCUMENTS

| | | |
|---|---|---|
| 7,640,262 B1 | 12/2009 | Beaverson et al. |
| 8,938,469 B1 | 1/2015 | Keen et al. |
| 9,083,710 B1 | 7/2015 | Yadav |
| 9,906,592 B1 * | 2/2018 | Roitshtein et al. ........................ H04L 67/1036 |
| 2005/0147111 A1 | 7/2005 | Moleyar |
| 2006/0085554 A1 | 4/2006 | Shah et al. |
| 2008/0086464 A1 | 4/2008 | Enga |
| 2013/0173908 A1 | 7/2013 | Matthews et al. |
| 2014/0029619 A1 * | 1/2014 | Patton et al. ....... H04L 45/7453 370/392 |
| 2016/0099872 A1 * | 4/2016 | Kim et al. ............ H04L 47/125 370/235 |
| 2016/0182373 A1 * | 6/2016 | Wang et al. ........ H04L 45/7453 370/392 |
| 2016/0241474 A1 | 8/2016 | Zhou et al. |
| 2017/0161203 A1 | 6/2017 | Alameldeen et al. |
| 2018/0219783 A1 | 8/2018 | Pfister et al. |

OTHER PUBLICATIONS

U.S. Appl. No. 16/294,829, filed Mar. 6, 2019 (unpublished), 60 pages.
U.S. Appl. No. 16/294,840, filed Mar. 6, 2019 (unpublished), 61 pages.

* cited by examiner

RESILIENT HASHING WITH MULTIPLE HASHES

CROSS-REFERENCES TO RELATED APPLICATIONS

The present application is related to the following commonly-owned patent applications filed concurrently herewith:

1. U.S. patent application Ser. No. 16/294,829, entitled "IMPLEMENTING HISTORY-BASED CONNECTION-SERVER AFFINITY ON A NETWORK LOAD BALANCER"; and
2. U.S. patent application Ser. No. 16/294,840, entitled "RESILIENT HASHING WITH COMPRESSION."

The entire contents of these related patent applications are incorporated by reference herein for all purposes.

BACKGROUND

A network load balancer is a device that distributes network connections for a service (e.g., a website, web application, email service, etc.) among a group of servers configured to process those connections. For example, if the service is a website, the group of servers may be web servers that each host an instance of the website. By performing this distribution, the network load balancer effectively spreads the processing load imposed by the network connections across the multiple servers, thereby allowing the service to scale beyond the processing capacity of a single server.

Most network load balancers available today are implemented in software that runs on general purpose computer systems, such as Intel x86-based systems. This is largely because the algorithms and data structures used by these network load balancers require an amount of memory that exceeds the memory capacity of existing application-specific integrated circuits (ASICs). However, the network bandwidth of a general purpose computer system is orders of magnitude less than an ASIC-based device, which means that ASIC-based network load balancers have the potential to deliver far greater performance at a given price point (or similar performance at a significantly lower price point) than software-based network load balancers.

SUMMARY

Techniques for implementing resilient hashing with multiple hashes are provided. In one set of embodiments, a network device can maintain a first hash table comprising mappings between a first set of hash indices and a set of bit values, where for each mapping in the first hash table: (1) the mapping's hash index corresponds to one of a group of next-hop destinations to which network packets received by the network device may be transmitted, and (2) the mapping's bit value indicates whether the mapping's hash index corresponds to an active or inactive next-hop destination. The network device can also maintain a second hash table comprising mappings between a second set of hash indices and active next-hop destinations in the group of next-hop destinations. Upon receiving a network packet, the network device can compute a first hash value using a portion of the network packet and a first hash function, and can match the first hash value to a first mapping in the first hash table based on the first mapping's hash index. When the first mapping's bit value indicates that the first mapping's hash index corresponds to an active next-hop destination, the network device can further match the first hash value to a second mapping in the second hash table based on the second mapping's hash index and send the network packet to the second mapping's active next-hop destination.

The following detailed description and accompanying drawings provide a better understanding of the nature and advantages of particular embodiments.

DETAILED DESCRIPTION

Embodiments of the present disclosure are directed to techniques that may be implemented in a network load balancer to improve the efficiency of its design and operation. Several of these techniques reduce the amount of memory needed by the network load balancer to carry out its load balancing functions, which advantageously allows the network load balancer to be built in hardware (e.g., using one or more ASICs).

It should be appreciated that the examples and details presented in the following sections are illustrative and not intended to limit the scope the present disclosure. For example, certain techniques may be implemented without some of the presented details or with functional equivalents thereof.

Further, while the present disclosure is framed as relating to the design of a network load balancer (i.e., a device that load balances network connections for a service across a group of servers), some of the techniques described herein may also be applied to other types of network devices and/or contexts. By way of example, the improved resilient hashing approaches presented in sections (3) and (4) below are not solely limited to use in network load balancers and may be applied to any context or in any network device where hashing is needed or desired, such as equal cost multi-path (ECMP) routing.

1. Example Network Environment

Figure 1:
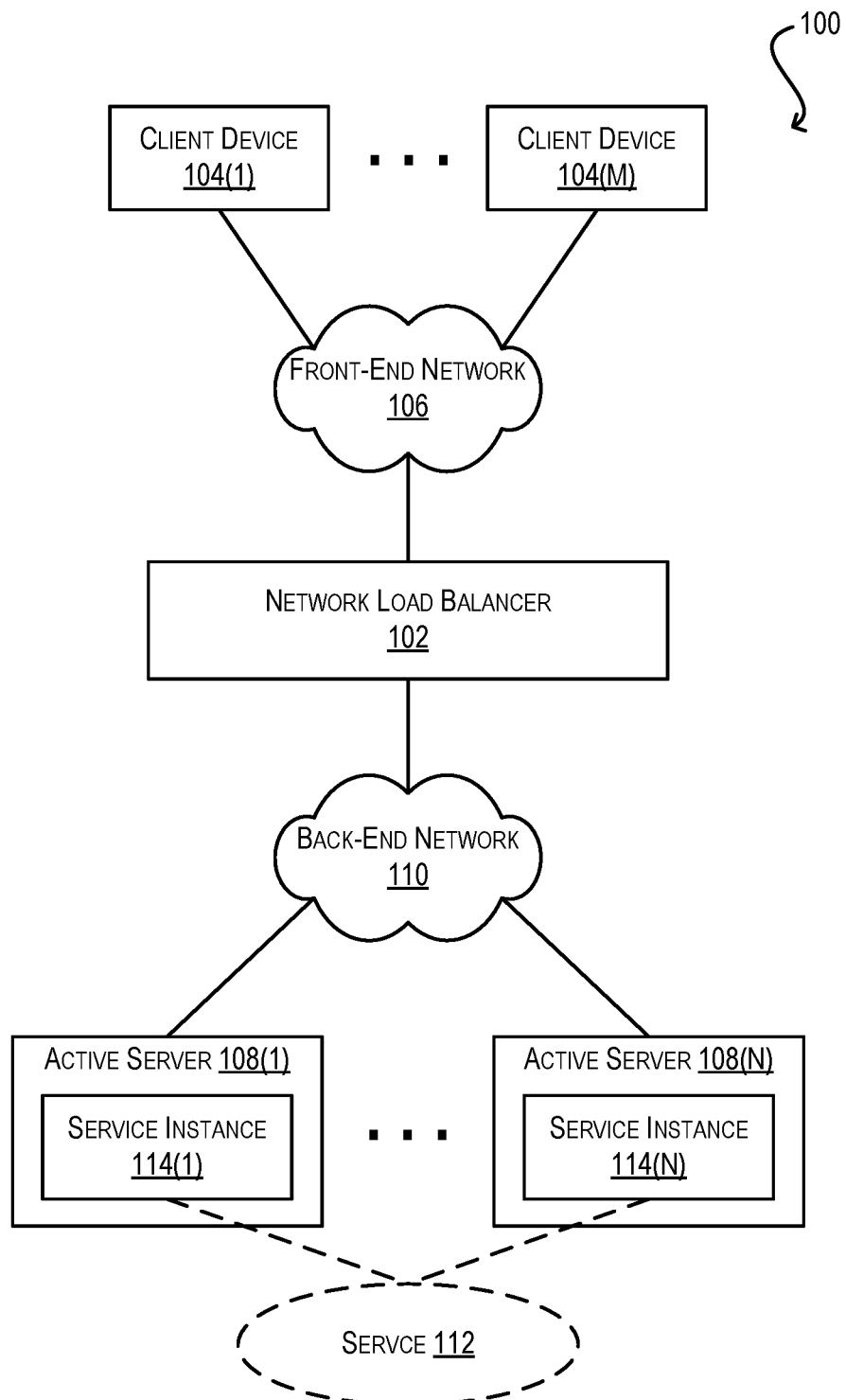
FIG. 1 depicts an example network environment according to an embodiment.

FIG. 1 is a simplified block diagram illustrating an example network environment 100 comprising a network load balancer 102 according to an embodiment. As shown, network load balancer 102 is communicatively coupled with a number of client devices 104(1)-(M) via a first (i.e., front-end) network 106. Front-end network 106 may be, e.g., a campus area network, a wide area network, or the Internet. Network load balancer 102 is also communicatively coupled with a number of active servers 108(1)-(N) (the term "active" is explained below) via a second (i.e., back-end) network 110. Back-end network 110 may be, e.g., a data center network spanning one or more data centers where network load balancer 102 and active servers 108(1)-(N) are deployed. Client devices 104(1)-(M) are configured to interact with a service 112, such as a website, a web application, an email service, a server component of a client/server application, etc. that is hosted on each active server 108 in the form of a service instance 114.

In a typical workflow, a client device 104 will transmit network packets intended for service 112 (e.g., packets comprising a client request) to a virtual IP address (VIP) that is advertised as being the IP address of service 112 but leads to network load balancer 102. Upon receiving each of these packets, in an embodiment, network load balancer 102 will select a server from among active servers 108(1)-(N) based on a 5-tuple of the packet comprising <source IP address, source port, destination IP address, destination port, protocol>. This 5-tuple identifies a network connection, such as Transmission Control Protocol (TCP) connection, of which the packet is a part. Network load balancer 102 will then forward the packet to the selected server and the selected server will process the packet via its service instance 114.

In FIG. 1, servers 108(1)-(N) are designated as "active" servers because each server 108 is operational and capable of accepting/processing packets corresponding to new network connections for service 112. Service 112 may also be associated with a number of "inactive" servers (not shown) that are not currently able to accept/process new network connections or any packets at all for the service, but may be able to do so at a future point in time. For example, these inactive servers may have experienced a failure, may be undergoing maintenance, may not be ready for deployment, etc. Taken together, the active and inactive servers of service 112 represent the service's "server group" and the maximum size of this server group is typically capped by a maximum group size parameter that is defined for the service on load balancer 102.

Generally speaking, the primary goals of network load balancer 102 are to (1) distribute the incoming network traffic for service 112 across active servers 108(1)-(N) on a per-connection basis, such that all packets for a given network connection are sent to the same active server, and (2) ensure that this distribution across active servers 108(1)-(N) is performed in a relatively even manner. Goal (1) is important because once an initial packet (e.g., a TCP SYN packet) is received by a first active server from a client device and a network connection is established between these two entities, the first active server creates local connection state information that is needed to process further packets in the same connection. This connection state information is unavailable to the other active servers. Thus, if a second or subsequent packet in that network connection is transmitted by network load balancer 102 to a second active server instead of the first (i.e., original) active server, the second active server will not recognize the connection and cause the connection to be reset.

Goal (2) is important because the main purpose of network load balancer 102 is to spread out the processing load for service 112 among active servers 108(1)-(N). If one active server ends up with a significantly larger percentage of the incoming traffic than other active servers, that server may become unnecessarily overloaded.

Goals (1) and (2) are easy to achieve in a steady state where no active servers are added to or removed from the server group of service 112; in this case, a simple modulo N hashing (where N is the number of active servers) based on packet 5-tuples, or some other combination of packet header fields that uniquely identify a network connection, will result in relatively even distribution of network traffic for service 112 across its active servers at network connection granularity, and the packets for a given network connection will always be sent to the same active server.

However, in real-world deployments the number of active servers for a service will change at least occasionally. For instance, one or more active servers may fail or be brought offline for maintenance (thus rendering them inactive), one or more inactive servers may be transitioned to active status for additional processing capacity, and so on. When this happens, modulo N hashing becomes problematic. Accordingly, to realize goals (1) and (2) in the face of active server additions and removals, many network load balancers today employ a combination of two features—resilient hashing and stateful load balancing.

Resilient hashing involves mapping, using a hash function $h(x)$, the 5-tuple of an incoming network packet for a service to one of B groupings, referred to as "buckets," where the total number of buckets B is larger than the maximum group size (and thus, larger than the number of active servers N) for the service. For example, a common construction for $h(x)$ is $k(x)$ modulo B, where $k(x)$ is an existing checksum or hash function such as CRC-16 and where B=(maximum group size)×(a replication factor R). The hash value that is computed as a result of applying $h(x)$ to the packet's 5-tuple is effectively an identifier (ID) of a bucket (e.g., a bucket ID in the range [0 . . . B−1]) to which the packet and its network connection belongs. Once this hash value/bucket ID has been computed, it is used to perform a lookup into a hash table comprising a total of B {bucket ID→active server ID} mappings (one mapping for each unique bucket ID in the range [0 . . . B−1]). The active server IDs in these mappings may be, e.g., server IP addresses or user-defined ID values that can be used to find each server's IP address. Since B=maximum group size×R, multiple buckets (e.g., at least R buckets) will be mapped to each active server in the hash table. Upon matching a particular hash table mapping based on the computed hash value/bucket ID, the packet is forwarded to the active server identified in the matched mapping.

The main advantage of resilient hashing over modulo N hashing is that there is considerably less "churn" in {bucket ID→active server ID} mappings in the hash table when an active server is added or removed. Stated another way, resilient hashing minimizes the number of existing {bucket ID→active server ID} mappings that need to be changed upon an active server addition or removal because, unlike modulo N hashing, the divisor B in $h(x)$ is fixed. To ensure that the network connections for a service are balanced evenly across the service's active servers when using resilient hashing, replication factor R is commonly set to a relatively large value, such as the service's maximum group size. Thus, for example, if the service has a maximum group size of 32, there will be a total of 32×32=1024 buckets for the service in the hash table. By using a relatively large replication factor R (which increases the total number of buckets B), each bucket in the hash table will map to a relatively small number of network connections. This, in turn, allows for more even load distribution if, e.g., an active server is removed or if B is not evenly divisible by N.

Stateful load balancing involves maintaining, on the network load balancer, per-connection state information that identifies, among other things, the server to which the first packet in a network connection has been sent. For example, if the network load balancer receives an initial packet (e.g., a TCP SYN packet) for a network connection C1 and sends that initial packet to server S1, the network load balancer will remember that C1 is associated with S1. Thus, the network load balancer can use this state information to achieve "connection-server affinity"—in other words, ensure that any subsequent packets it receives that are part of connection C1 are also sent to server S1, regardless of server addition or removal events that cause the bucket for C1 to be remapped to a different server in the load balancer's hash table.

Unfortunately, while resilient hashing and stateful load balancing are serviceable solutions for realizing network load balancing goals (1) and (2), they also suffer from a number of drawbacks. For instance, due to the need to replicate hash table mappings via replication factor R to achieve even load distribution, resilient hashing can consume a significant amount of memory for maintaining the hash table, particularly if the network load balancer needs to handle a large number of services (which each require their own set of hash table mappings) and/or the maximum group size per service is large. Similarly, due to the need to remember state for every concurrent connection, stateful load balancing can consume a significant amount of memory for maintaining this per-connection state information. In many enterprise load balancing scenarios, these two features (either individually or in combination) can require an amount of memory that exceeds the on-chip memory capacity of existing ASICs, which makes it impossible, or at least economically infeasible, to build ASIC-based network load balancers using these features as-is.

To address the foregoing issues, the remaining sections of this disclosure present various techniques that can be implemented in a network load balancer like load balancer 102 of FIG. 1 to reduce or eliminate the memory burden imposed by resilient hashing and stateful load balancing. Accordingly, these features make it possible to build more feasibly the functionality of network load balancer 102 in hardware (e.g., using one or more ASICs) rather than in software.

For example, section (2) below describes a technique referred to as "history-based connection-server affinity" that enables network load balancer 102 to ensure that all of the packets in a given network connection ultimately reach the original server to which the initial packet in the connection was sent, without needing to store per-connection state information as in stateful load balancing. History-based connection-server affinity accomplishes this by maintaining, on the network load balancer, server history information that is associated with each hash table bucket.

Further, sections (3) and (4) below describe two improved resilient hashing schemes, referred to as "resilient hashing with multiple hashes" and "resilient hashing with compression," that achieve the same or nearly similar benefits as conventional resilient hashing but require substantially less memory to do so. Sections (3) and (4) also describe specific implementations of the history-based connection-server affinity feature that can be used in combination with these two improved resilient hashing schemes.

Yet further, sections (5) and (6) below describe additional techniques that make history-based connection-server affinity more space-efficient (i.e., "history deduplication" in section (5)), and the creation of hash table mappings more robust (i.e., "deterministic hash table distribution" in section (6)).

It should be appreciated that network environment 100 of FIG. 1 is illustrative and not intended to limit embodiments of the present disclosure. For example, although only a single network load balancer 102 is depicted for clarity of explanation, in some deployments two or more network load balancers may be used between client devices 104(1)-(M) and active servers 108(1)-(N) for improved availability or redundancy. In these cases, each such network load balancer may implement the techniques described herein.

As another example, although only a single service 112 is depicted in FIG. 1, in some deployments network load balancer 102 may be configured to load balance network traffic/connections for multiple services, such as with each associated with a different VIP (or VIP/port combination). In these cases, network load balancer 102 will be communicatively coupled with the active servers for each service and will maintain hash table mappings and other information (e.g., connection-server affinity history information) for each service in order to perform its load balancing functions. One of ordinary skill in the art may recognize other common variations, modifications, and alternatives for the configuration/arrangement of network environment 100.

2. History-Based Connection-Server Affinity

History-based connection-server affinity is a network load balancing technique that provides the benefits of stateful load balancing (e.g., connection-server affinity in the face of active server additions or removals), without requiring the network load balancer to maintain state information for every network connection. Instead, in certain embodiments the network load balancer maintains history information that includes, for each bucket ID in the load balancer's hash table, a list of servers to which the network connections in the bucket identified by the bucket ID were previously mapped within the hash table (if any). The network load balancer keeps this history information up-to-date on an ongoing basis by updating it in response to active server additions or removals that necessitate changes to the hash table's {bucket ID→active server ID} mappings. For example, if a bucket B1 is remapped from server S1 to server S2 in the hash table, the network load balancer creates or updates an entry in the history information for bucket B1 that identifies S1 as a previously-mapped server for B1.

With this history information in place, if the network load balancer sends a network packet to a first active server and receives the packet back from that server (indicating that the server does not recognize the network connection of which the packet is a part), the network load balancer performs a lookup into the history information using, e.g., the packet's bucket ID and finds a second server to which that bucket ID was previously mapped. Through this step, the network load balancer essentially identifies another server to which the packet's network connection was previously sent. The network load balancer then sends the network packet to the second server, and this process repeats until (1) the packet is no longer returned to the network load balancer (indicating that the last server which received the packet recognizes the packet's network connection and thus is able to process it), or (2) all servers associated with the bucket ID in the history information are exhausted (at which point the connection is reset).

Because the history information used for this approach is maintained on a per-bucket rather than per-connection basis on the network load balancer, history-based connection-server affinity can be implemented using far less memory than stateful load balancing. This is a consequence of the fact that, generally speaking, the number of buckets in the network load balancer's hash table will be orders of magnitude less than the total number of concurrent network connections than the load balancer is capable of handling.

Additionally, because the history-based connection-server affinity workflow is largely controlled by the network load balancer, it does not require substantial changes on the server side. Each server need only be configured to send a load-balanced packet back to the network load balancer if the server does not recognize the packet's network connection (based on, e.g., the server's conventional connection state table).

It should be noted that, given the nature of the history information, history-based connection-server affinity assumes that the network load balancer implements some form of resilient hashing and thus makes use of a hash table comprising {bucket ID→active server ID} mappings for initial server selection. However, history-based connection-server affinity is independent of the particular way in which this hash table is physically stored/represented in memory or the particular hash function(s) that are used, and thus this solution can be implemented in combination with conventional resilient hashing or any variant thereof (including the improved resilient hashing schemes disclosed in sections (3) and (4) below).

Figure 2A:
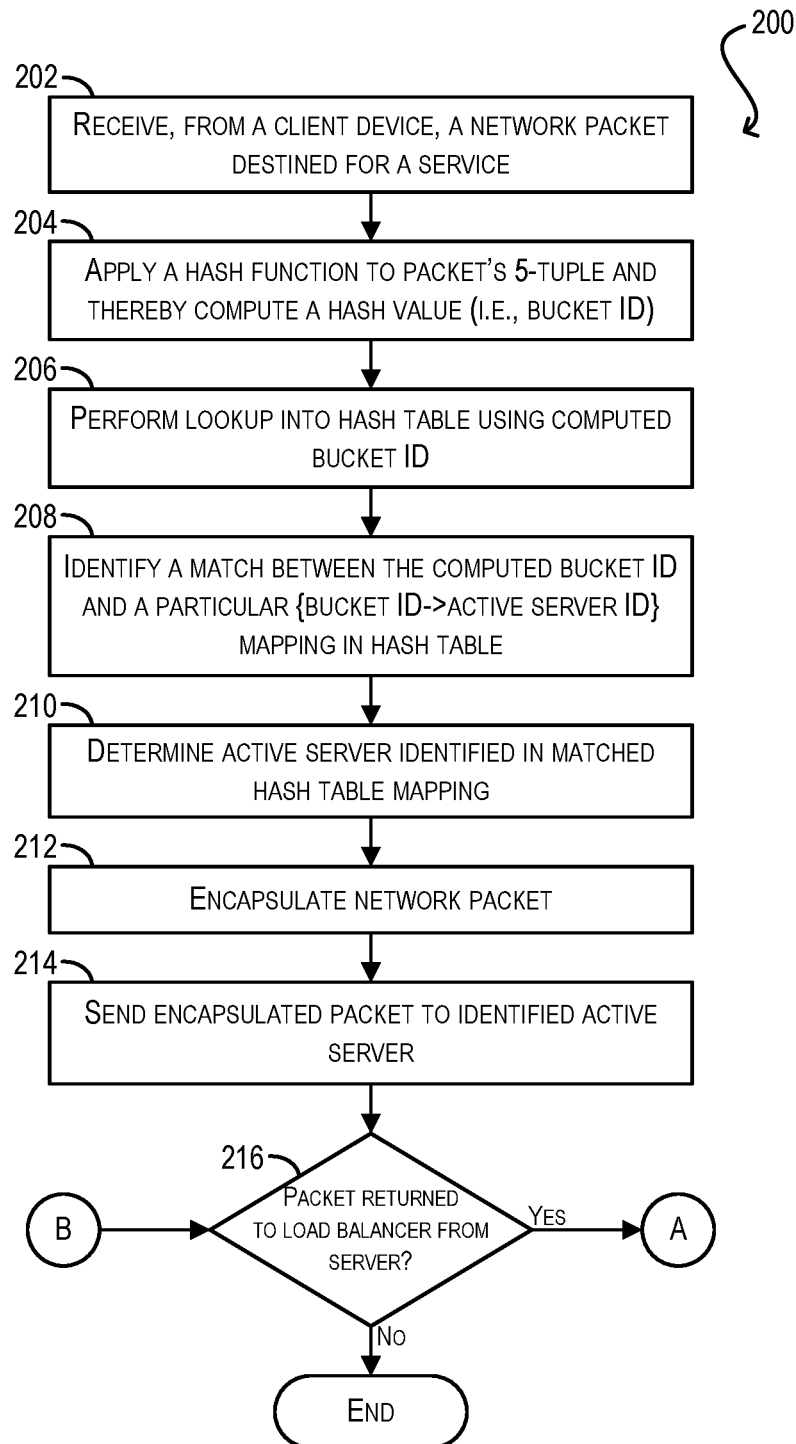
FIGS. 2A and 2B depict a workflow for implementing history-based connection-server affinity according to an embodiment.
Figure 2B:
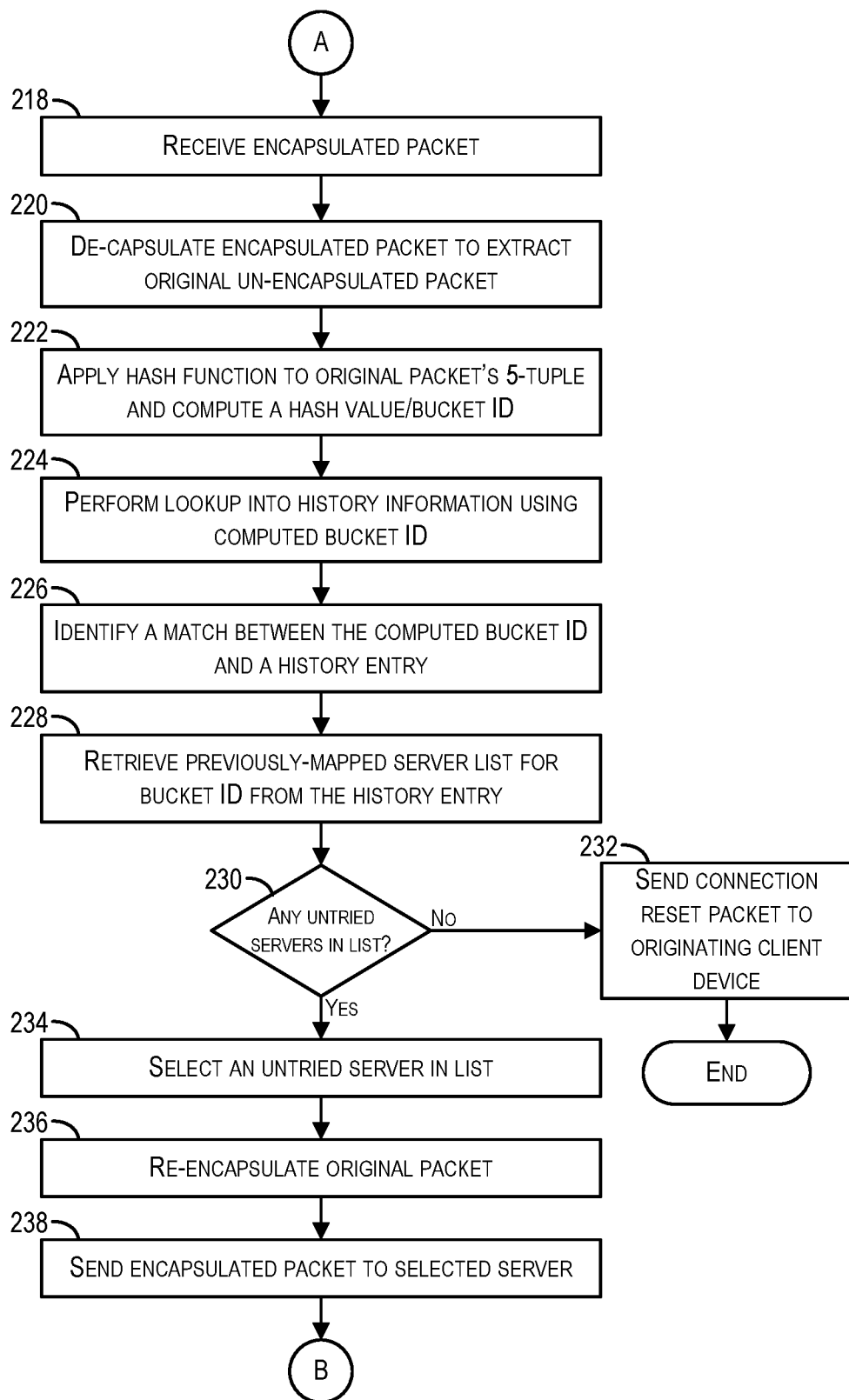

FIGS. 2A and 2B depict a high-level workflow 200 that can be performed by network load balancer 102 of FIG. 1 for implementing history-based connection-server affinity in the context of network environment 100 according to an embodiment.

Starting with block 202 of FIG. 2A, network load balancer 102 can receive, from a client device 104, a network packet destined for service 112 (e.g., a packet sent to the VIP or VIP/port of service 112). The received packet is assumed to be part of a network connection that has been, or will be, established between the originating client device and a server in the server group of service 112, and this network connection is identified by, e.g., a 5-tuple of <source IP address, source port, destination IP address, destination port, protocol> or some other combination of header fields in the packet.

At block 204, network load balancer 102 can apply a hash function to the packet's 5-tuple/header field combination and thereby compute a hash value corresponding to a bucket ID, where the bucket ID identifies a bucket to which the packet's network connection "belongs"—in other words, a bucket to which the packet's network connection has been mapped per the hash function. Network load balancer 102 can then perform a lookup into its hash table using the computed bucket ID (block 206), identify a match between that bucket ID and a {bucket ID→active server ID} mapping in the hash table based on the mapping's bucket ID field (block 208), and determine the active server identified in the matched hash table mapping (block 210). This determined active server is the server to which the packet's network connection, and all other network connections in the same bucket, are currently assigned.

At block 212, network load balancer 102 can encapsulate the packet with a header (e.g., a User Datagram Protocol (UDP) header) that identifies the source IP address of the encapsulated packet as the physical IP address of network load balancer 102 and the destination IP address of the encapsulated packet as the physical IP address of the active server determined at block 210. Network load balancer 102 can then send the encapsulated packet to that active server (block 214) and check whether the packet is returned back to the load balancer (block 216).

If the encapsulated packet is not returned at block 216, network load balancer 102 can conclude that the server recognizes the network connection of the original un-encapsulated packet (or that the original packet is the initial packet of the connection) and thus the server will process it. Accordingly, no further action is needed on the part of network load balancer 102 and workflow 200 can end. In various embodiments, network load balancer 102 does not need to wait in a busy loop at block 216 to continuously check whether the network packet is returned; instead, network load balancer 102 can continue with its normal runtime operation and simply refrain from proceeding with the remainder of workflow 200 if the packet is not returned.

However, if the encapsulated packet is returned back to network load balancer 102 at block 216, network load balancer 102 can conclude that the server does not recognize the original packet's network connection. This will occur if, e.g., the network connection was previously established with a different active server and the {bucket ID→active server ID} mapping for the connection's bucket was subsequently changed.

In this case, workflow 200 can proceed to FIG. 2B. At blocks 218-224 of FIG. 2B, network load balancer 102 can receive the encapsulated packet (which, in an embodiment, will have switched source and destination IP addresses in its outer header), de-capsulate it to extract the original un-encapsulated packet, apply the same hash function as block 204 to the original packet's 5-tuple/header field combination in order to compute a bucket ID, and perform a lookup into the load balancer's history information using the computed bucket ID. As mentioned previously, this history information can comprise entries that associate each bucket ID in the hash table to a list of servers (e.g., server IDs) to which that bucket was mapped in the hash table in the past (if such previously-mapped servers exist).

At blocks 226 and 228, network load balancer 102 can identify a match between the computed bucket ID and an entry in the history information and retrieve the server list included in the matched entry. Network load balancer 102 can then check whether there are any servers in the list to which the load balancer has not yet tried sending the original packet (block 230). If not, network load balancer 102 can conclude that the server which originally established the packet's network connection is no longer available, send a connection reset command/packet to the originating client device (block 232), and terminate the workflow.

On the other hand, if network load balancer 102 determines that there are one or more servers in the list to which it has not yet tried sending the packet, network load balancer 102 can select one of those servers (block 234). In a particular embodiment, the server list can be temporally ordered according to the sequence in which the servers were previously mapped to the bucket ID and the selection at block 234 can comprise selecting the most recent previously-mapped server in the list.

Finally, network load balancer 102 can re-encapsulate the original packet with a header that identifies the source IP address as the physical IP address of network load balancer 102 and the destination IP address as the physical IP address of the selected server (block 236), transmit the encapsulated packet to that server (block 238), and return to block 216 of FIG. 2A. If the network packet is not returned back from the server at block 216, workflow 200 can end. Otherwise, the subsequent steps of the workflow can repeat until an end condition is reached (e.g., the packet is not returned back by a server or all previously-mapped servers for the bucket are tried).

In some cases, one or more of the servers included in the server list retrieved at block 228 may go offline or otherwise become unresponsive/non-operational. In these cases, if network load balancer 102 transmits the network packet to such a server at block 238, the server will not respond, regardless of whether the server recognizes the packet's network connection or not. To mitigate this, in certain embodiments network load balancer 102 can implement another process (e.g., a process separate from the process executing workflow 200) that monitors the liveness of the servers in service 112's service group and removes any servers that are no longer alive (in other words, unavailable). This can ensure that the network packet will eventually traverse all of the prior-mapped servers in the server list if appropriate and trigger the reset behavior at block 232. If a network packet is sent by network load balancer 102 to an unavailable prior-mapped server before the down status of that server is detected, that packet will timeout and be retransmitted by the originating client.

It should be appreciated that high-level workflow 200 is illustrative and various modifications are possible. For example, although workflow 200 suggests that the history information maintained on network load balancer 102 is stored in the form of history entries that associate bucket IDs with lists of servers previously mapped to those bucket IDs, the actual physical representation of this history information can vary. For example, in one set of embodiments the history information may be split into two tables: a first table that comprises associations between bucket IDs and version IDs, and a second table that comprises associations between version IDs and previously-mapped server IDs. In this representation (described in sections (3) and (4) below), network load balancer 102 can embed a version ID in the encapsulated packet that is sent to a server and this version ID can be decremented for each server that is tried. When a packet is returned from a server, network load balancer 102 can extract the version ID from the returned packet and use the extracted version ID to perform a lookup into the second table and thereby identify a next previously-mapped server to try.

In another set of embodiments, the history information may be structured according to a canonical ordering of server IP addresses. In these embodiments, the history information can comprising mappings between (1) bucket IDs and server IP addresses, and (2) "next" server IP addresses, where the next server IP address field indicates the next server to try sending a packet to if the packet is returned from a server having the server IP address identified in key field (1). This approach avoids the need for a separate version table and does not require any metadata (such as version ID) to be included in encapsulated packets sent to servers, but does not maintain any temporal information regarding the order in which servers were previously mapped to a bucket ID. Accordingly, this approach may require sending a packet to multiple servers (according to the canonical ordering) until the most recent previously-mapped server is reached.

Further, although not shown in FIGS. 2A and 2B, on a periodic basis network load balancer 102 can "age out" previously-mapped servers from the history information and thus discard information regarding those servers after some predefined age-out interval. For example, if bucket B1 is remapped in the hash table from server S1 to server S2 and this results in the creation of a mapping in the history information between B1 and S1, this mapping can be maintained in the history information for an age-out interval of, e.g., 15 minutes. Once the interval has expired, the mapping can be removed from the history information to make room for further history entries. In one set of embodiments, the length of the age-out interval can be set to be longer than the lifespan of a typical network connection.

Figure 3A:
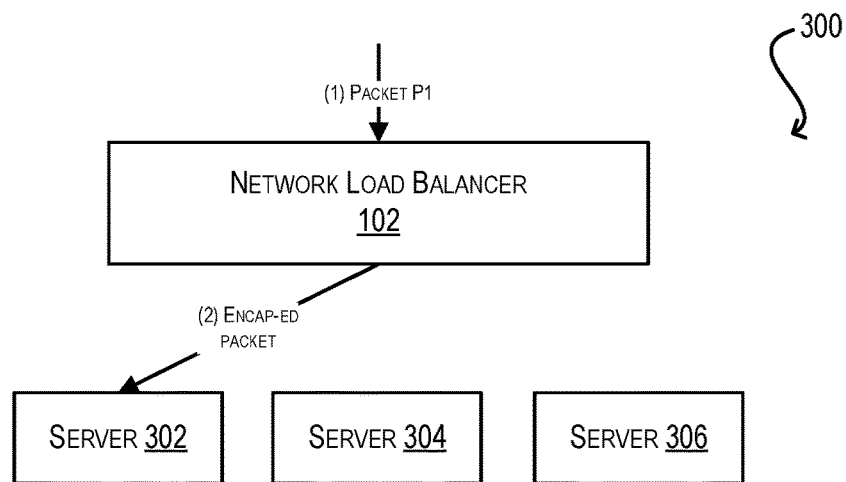
FIGS. 3A, 3B, and 3C depict an example scenario for the workflow of FIGS. 2A and 2B according to an embodiment.
Figure 3B:
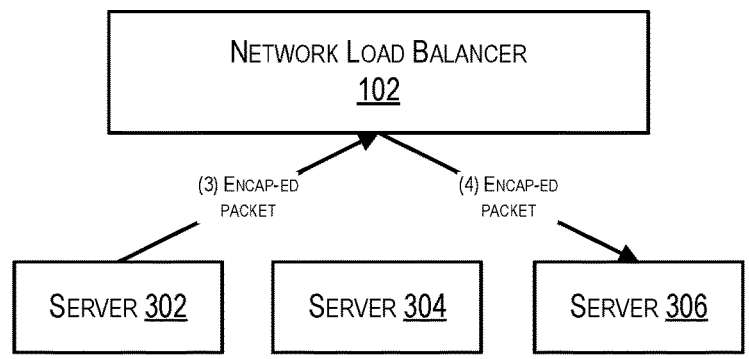
Figure 3C:
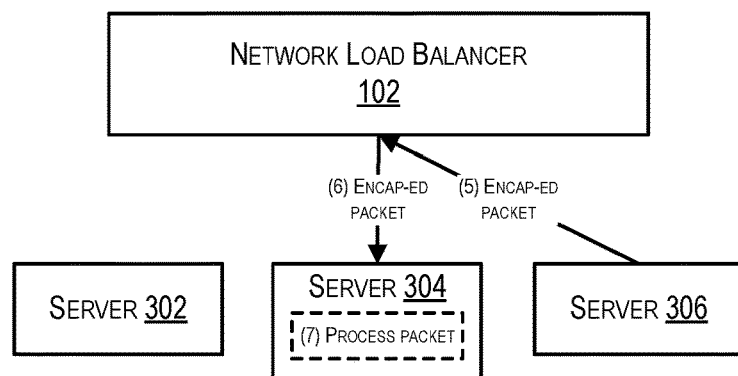

To further clarify the processing performed in workflow 200, FIGS. 3A, 3B, and 3C depict an example scenario 300 according to an embodiment. In this example, the following is assumed:

1. The client-originated packet P1 that network load balancer 102 receives in FIG. 3A is part of a network connection C1 that belongs to bucket B1 per the load balancer's hash function
2. Bucket B1 is currently mapped to server 302 in the load balancer's hash table
3. Network connection C1 was originally established by server 304
4. Bucket B1 is associated with ordered server list [306, 304] in the load balancer's history information As shown in FIG. 3A, network load balancer 102 receives packet P1 from a client device (step 1), determines that P1 should be sent to server 302 per its hash table, and transmits an encapsulated version of the packet to server 302 (step 2).

In FIG. 3B, network load balancer 102 receives the encapsulated packet back from server 302 because server 302 does not recognize network connection C1 (step 3). In response, network load balancer 102 de-capsulates the packet, identifies server 306 as the next server to be tried per its history information, and transmits an encapsulated version of the packet to server 306 (step 4).

In FIG. 3C, network load balancer 102 receives the encapsulated packet back from server 306 because server 306 also does not recognize network connection C1 (step 5). In response, network load balancer 102 de-capsulates the packet, identifies server 304 as the next server to be tried per its history information, and transmits an encapsulated version of the packet to server 304 (step 6). Finally, server 304 recognizes network connection C1 and processes the packet (step 7).

3. Resilient Hashing with Multiple Hashes

As explained previously, conventional resilient hashing involves applying a hash function h(x) to the 5-tuple of a packet destined for a service, where h(x)=k(x) modulo B and where B (i.e., the total number of buckets)=(maximum group size of the service)×(replication factor R). Upon applying h(x), the resulting hash value (i.e., a bucket ID) is used to perform a lookup into a hash table comprising B {bucket ID→active server ID} mappings, and the packet is sent to the active server identified in the matched hash table mapping.

Replication factor R is typically set to a relatively large value (such as, e.g., maximum group size) in order to guarantee relatively even traffic distribution among active servers in the case of a server addition or removal. To understand why this is the case, consider a scenario where R=1, maximum group size=32, and N (total active servers) =32. In this scenario, there will be 32 buckets in the hash table and each active server will be assigned to exactly one bucket. If an active server is subsequently removed (resulting in 31 active servers), the single bucket that was assigned to the removed server will be re-mapped to one of the remaining 31 active servers (e.g., server S1). As a result, server S1 will receive approximately double the amount of network connections as the other 30 active servers, since it is now mapped to two buckets while every other active server is mapped to one bucket.

Now consider a similar scenario where replication factor R is set to 32 instead of 1. In this scenario, there will be 1024 buckets in the hash table and each active server will be assigned to 32 buckets. If an active server is subsequently removed (resulting in 31 active servers), 30 of the remaining active servers will receive one bucket previously mapped to the removed server, and one remaining active server (e.g., server S1) will receive two buckets previously mapped to the removed server. Thus, server S1 will receive just 1/33 more network connections than the other 30 active servers, because it is now mapped to 34 buckets while every other active server is mapped to 33 buckets.

The main problem with using a large value for R is that it significantly increases the size of the hash table when compared to modulo N hashing. For example, if the maximum group size of a service is 256 and R is set to equal maximum group size, 256×256=65536 buckets/mappings will be needed in the hash table for that single service. If there are multiple services to be load balanced, this number will increase further.

To address this problem, an improved resilient hashing scheme, referred to as "resilient hashing with multiple hashes," is described in the following subsections that provides the benefits of conventional resilient hashing, but avoids the need to replicate buckets/hash table mappings via a large replication factor R and thus avoids the high memory cost associated with such significant replication. As suggested by the name, this is achieved by using multiple hash tables/functions in a hierarchical manner to determine how to map incoming packets/network connections to active servers.

In one set of embodiments, two hash tables/functions can be employed to implement resilient hashing with multiple hashes. These embodiments, discussed in subsection (3.1) below, are collectively referred to as the "dual hashes" approach. In other embodiments, three (or more) hash tables/functions can be employed. These other embodiments are discussed in subsection (3.2) below.

It should be noted that while following subsections discuss the implementation of resilient hashing with multiple hashes in the context of network load balancing, this concept is not tied to network load balancing and instead can be applied to any context where hashing, and in particular resilient hashing, is used. An example of such a context is ECMP routing. Thus, the various steps attributed to a network load balancer in the following subsections can be performed by any network or computing device. In addition, the references to "servers" and "server IDs" in the following subsections (i.e., the entities that will receive hashed packets) can be interchangeably replaced with "next hop destinations" and "next hop destination IDs," where a next hop destination is simply a next network destination to which a hashed packet may sent.

3.1 Dual Hashes

Figure 4:
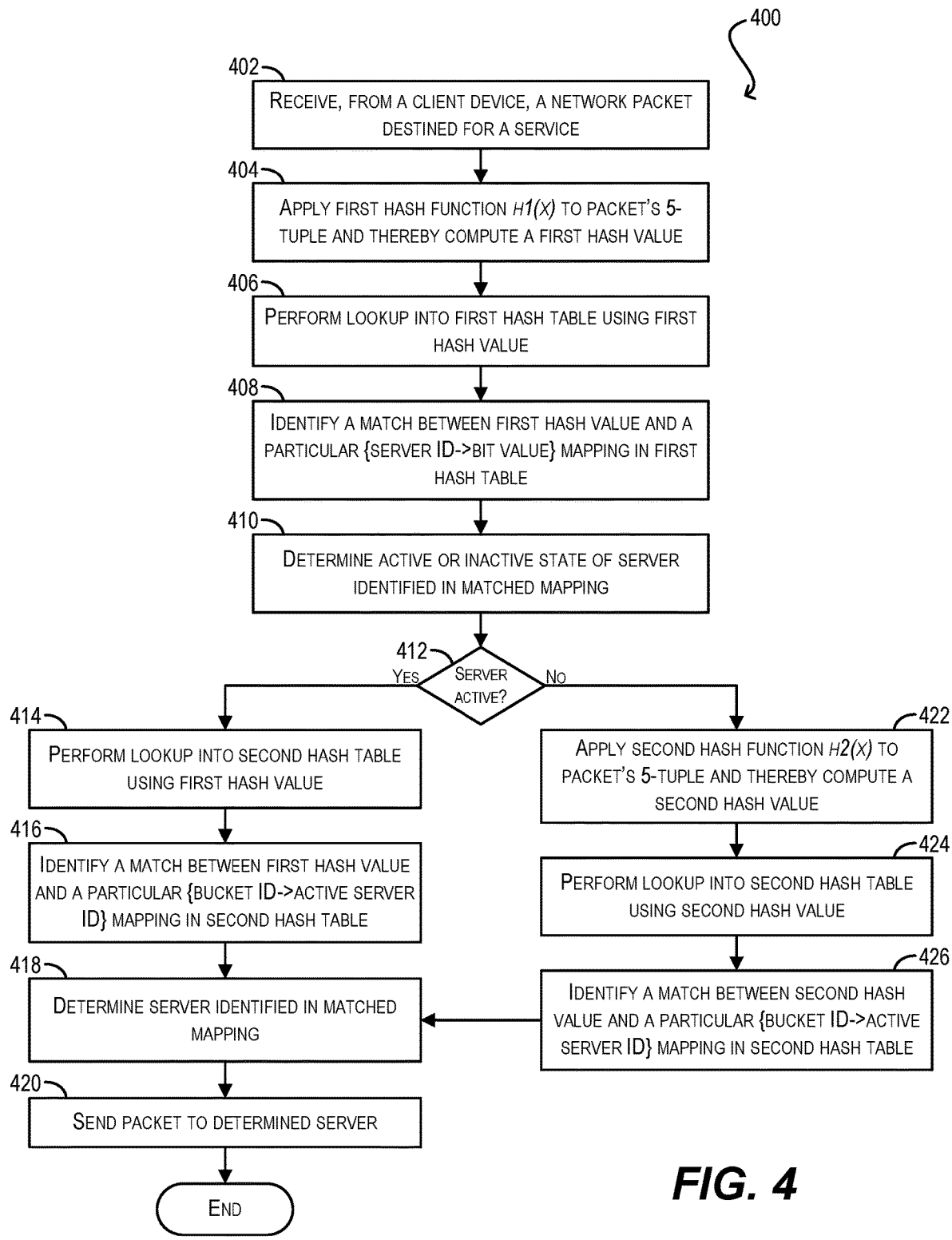
FIG. 4 depicts a workflow for implementing resilient hashing with multiple hashes according to an embodiment.

FIG. 4 depicts a workflow 400 that can be performed by network load balancer 102 of FIG. 1 for implementing resilient hashing with dual hashes according to an embodiment. Workflow 400 assumes that network load balancer 102 maintains a first hash table that includes mappings between (1) server IDs identifying the active and inactive servers in the server group of service 112, and (2) bit values indicating the current active or inactive states of these servers. For example, if service 112's maximum group size is 32, the first hash table can include 32 mappings corresponding to server IDs in the range [0 . . . 31] (or alternatively [1 . . . 32], and each server ID can be mapped to a bit value of 1 to indicate that server is active or a bit value of 0 to indicate that the server is inactive (or vice versa). This first hash table can be populated by referencing a user-defined configuration file that specifies, among other things, the maximum group size for the service, the server IDs for the servers in the service's server group, and the current active or inactive state of each server.

Workflow 400 further assumes that network load balancer 102 maintains a second hash table (sometimes referred to below as the "final lookup" table) that includes mappings between (1) bucket IDs (where the total number of buckets B is set to some predefined value) and (2) active server IDs for the service. This second hash table is functionally similar to the single hash table in conventional resilient hashing, but will not have as many buckets/mappings. In certain embodiments, if a server ID X in the first hash table is active, bucket ID X in the second hash table will map to active server ID X.

Turning now FIG. 4, at block 402 network load balancer 102 can receive a network packet from, e.g., a client device 104 that is destined for the VIP or VIP/port of service 112. In response, network load balancer 102 can apply a first hash function h1(x) to the packet's 5-tuple (or other header field combination uniquely identifying the packet's network connection) (block 404), where h1(x)=k1(x) modulo maximum group size, and where k1(x) is some existing checksum or hash function such as CRC-16. The result of this first hash computation is a first hash value in the range [0 . . . maximum group size−1] corresponding to a server in service 112's server group, and network load balancer 102 can use this first hash value to perform a lookup into the first hash table (block 406), identify a match between the first hash value and a particular {server ID→bit value} mapping in the first hash table (block 408), and determine the active or inactive state of the server from the bit value in the matched mapping (blocks 410/412).

If the server is active per the matched mapping's bit value, network load balancer 102 can use the first hash value computed at block 404 to perform a lookup into the second hash table (block 414), identify a match between the first hash value and a particular {bucket ID→active server ID} mapping in the second hash table based on the mapping's bucket ID field (block 416), and determine the active server identified in the matched mapping (block 418). As noted above, in certain embodiments each server ID X in the first hash table that is active will have a corresponding {X→X} mapping in the second hash table. Network load balancer 102 can then send the packet to the determined active server at block 420 (either in accordance with the history-based connection-server affinity workflow described in section (1) above or a conventional load balancing workflow) and workflow 400 can end.

On the other hand, if network load balancer 102 determines that the server is inactive per the matched mapping's bit value at block 412, network load balancer 102 can apply a second hash function h2(x) to the packet's 5-tuple/header field combination (block 422), where h2(x)=k2(x) modulo B, and where k2(x) is some existing checksum or hash function that is different from k1(x). The result of this second hash computation is a second hash value in the range [0 . . . B−1] corresponding to a bucket ID in the second hash table. Network load balancer 102 can use this second hash value to perform a lookup into the second hash table (block 424), identify a match between the second hash value and a particular {bucket ID→active server ID} mapping in the second hash table (block 426), and determine the active server identified in the matched mapping (block 418). Network load balancer 102 can then send the packet to that server per block 420 and workflow 400 can end.

With the approach shown in workflow 400, a packet that hashes, via the first hash function, to a server that is active in the first hash table will be sent to that active server per the second hash table (without executing the second hash function). However, a packet that hashes to a server that is inactive in the first hash table will trigger the execution of the second hash function, and that packet will be sent to an active server which is mapped to the resulting second hash value/bucket ID in the second hash table. Thus, the second hash function effectively distributes all of the traffic hitting an inactive server in the first hash table across the active servers of service 112. As a result, the hierarchical use of these two hash tables/functions achieves balanced traffic distribution across the active servers, even in scenarios where the total number of buckets B in the second hash table is relatively small.

For example, although the mathematical details are not presented here, the dual hashes approach in workflow 400 can achieve a degree of balance among the active servers with B=maximum group size×(maximum group size/2) that is comparable to conventional resilient hashing with B=maximum group size×maximum group size when an active server is removed. Accordingly, this dual hashes approach can advantageously yield significant memory savings over conventional resilient hashing. In particular embodiments, the first hash table can be implemented as a bit vector of length maximum group size and the second hash table can be implemented as a direct index table to optimize memory usage. In other embodiments, the first and/or second hash tables can be implemented using key-value arrays.

To further clarify the processing performed in workflow 400, consider an example scenario where service 112 has three active servers having server IDs 0, 1, and 3 respectively and the service's maximum group size is 1024. Further assume that the total number of buckets B in the second hash table is also 1024, and the first and second hash tables are populated as follows:

TABLE 1

First hash table

| Server ID | State |
| --- | --- |
| 0 | 1 (Active) |
| 1 | 1 (Active) |
| 2 | 0 (Inactive) |
| 3 | 1 (Active) |
| ... | ... |
| 1023 | 0 (Inactive) |

TABLE 2

Second hash table

| Bucket ID | Active Server ID |
| --- | --- |
| 0 | 0 |
| 1 | 1 |
| 2 | 1 |
| 3 | 3 |
| ... | ... |
| 1023 | 1 |

In this scenario, if network load balancer 102 receives a packet P1 that hashes to, e.g., server ID 0 via the first hash function, network load balancer 102 will find the active server ID mapped to bucket ID 0 in the second hash table, i.e., server 0, and will transmit P1 to server 0.

However, if network load balancer 102 receives a packet P2 that hashes to, e.g., server 2 via the first hash function, network load balancer 102 will determine that server 2 is inactive per its first hash table mapping. Accordingly, network load balancer 102 will hash the packet using the second hash function. Assume the execution of the second hash function results in a hash value/bucket ID of 1; in this case, the load balancer will find the active server ID mapped to bucket ID 1 in the second hash table, i.e., server 1, and will transmit P2 to server 1.

3.2 Three or More Hashes

In certain embodiments, network load balancer 102 can employ three (or more) hash tables/functions, instead of the two hash tables/functions used in the dual hashes approach described above. In these embodiments, network load balancer 102 can chain another hash table lookup that is similar to the first hash table lookup in the dual hashes approach, prior to the final lookup.

For example, if three hash tables/functions are used, the first hash table will comprise {server ID→active/inactive bit value} mappings for service 112, the second hash table will comprise the same {server ID→active/inactive bit value} mappings as the first hash table, and the third hash table (i.e., the final lookup table) will comprise {bucket ID→active server ID} mappings for service 112. When a client packet is received, network load balancer 102 will perform a lookup into the first hash table using previously described h1(x) and if an active server is matched, it will transmit the packet to that active server per the third hash (final lookup) table. But if an active server is not matched in the first hash table, network load balancer 102 will execute a second hash function h1'(x)=k1'(x) modulo maximum group size and use the resulting hash value to perform a lookup into the second hash table.

If an active server is matched via this second hash table lookup, it will transmit the packet to that active server per the third hash (final lookup) table. But if an active server is not matched in the second hash table, network load balancer 102 will execute a third hash function corresponding to previously described h2(x), use the resulting hash value to perform a final lookup into the third hash table, and send the packet to the identified active server.

Although adding one or more additional hash tables and lookups over the dual hashes approach increases the complexity of the overall hashing process, it allows for even better balancing of traffic among active servers when an active server is removed. In particular, the use of three hash tables/functions can achieve, with the total number of buckets B in the final lookup table set to maximum group size, a degree of balancing that is comparable to conventional resilient hashing with B=maximum group size×maximum group size.

Figure 5A:
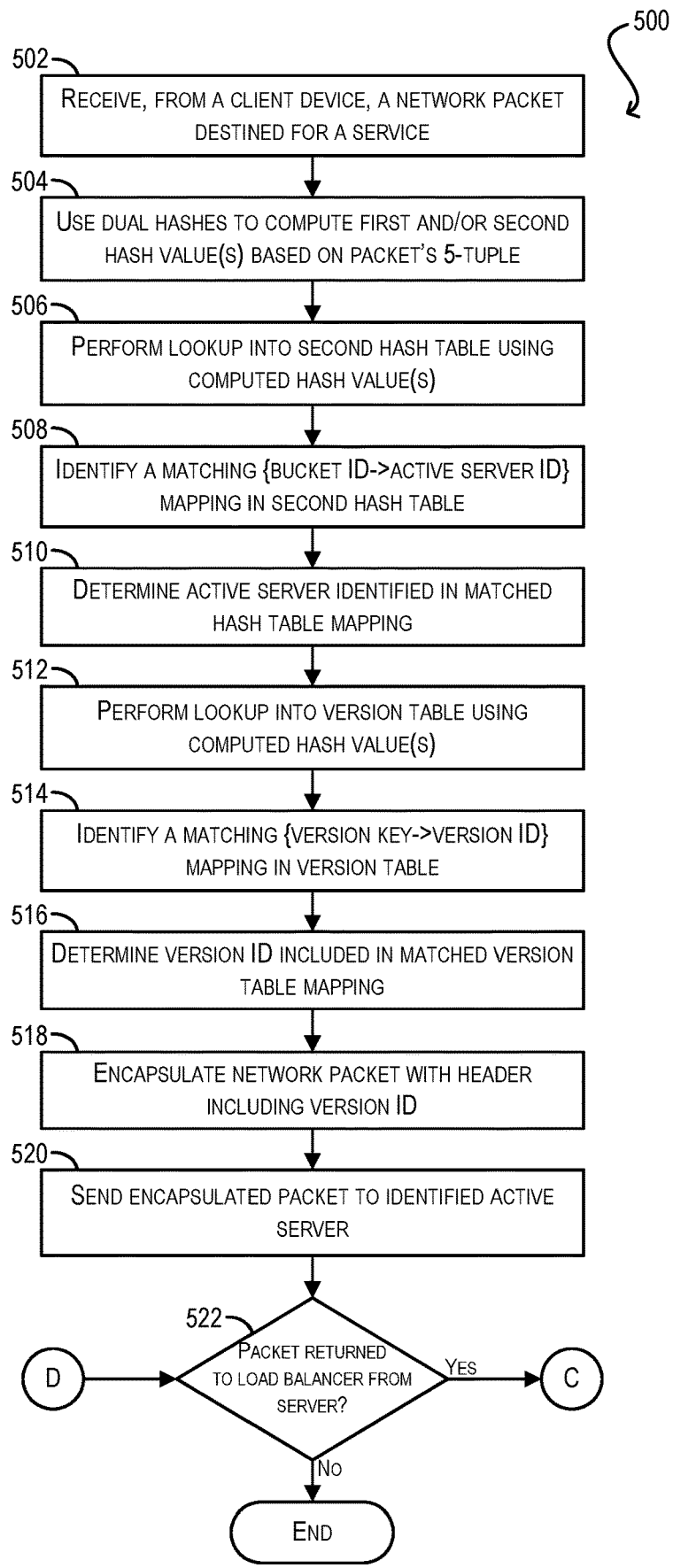
FIGS. 5A and 5B depict a workflow for implementing versioned history-based connection-server affinity using resilient hashing with multiple hashes according to an embodiment.
Figure 5B:
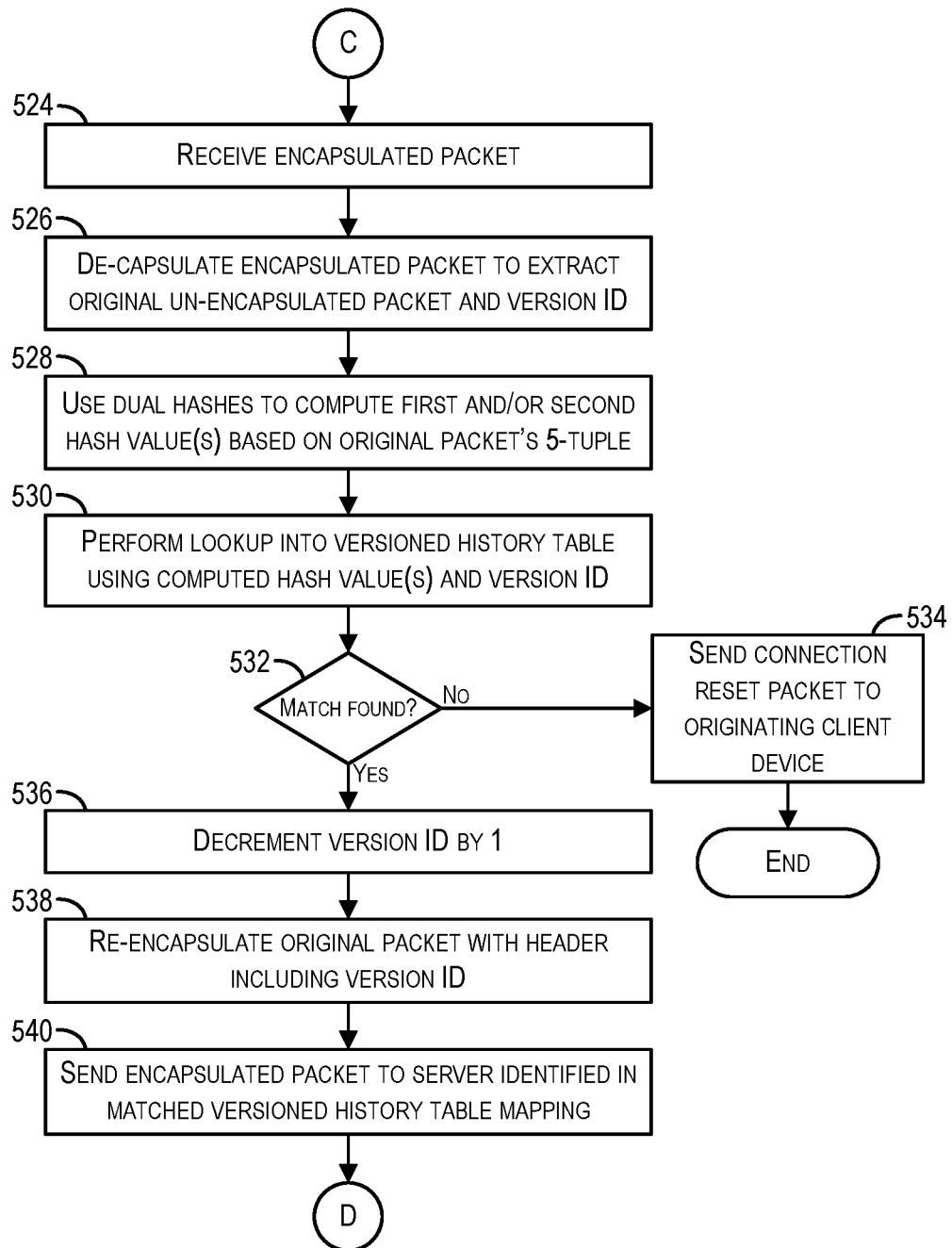

3.3 Versioned History-Based Connection-Server Affinity Using Dual Hashes Approach FIGS. 5A and 5B depict a workflow 500 that can be performed by network load balancer 102 of FIG. 1 to implement the history-based connection-server affinity feature described in section (2), in combination with the dual hashes approach for resilient hashing according to an embodiment. This specific implementation assumes that the history information maintained on network load balancer 102 is versioned and comprises two tables: a version table and a versioned history table.

In one set of embodiments, the version table includes mappings between (1) version keys, each version key being a value derived from (A) a possible hash value (e.g., in the range [0 . . . maximum group size−1]) generated by the first hash function h1(x) and (B) a possible hash value (e.g., in the range [0 . . . B−1]) generated by the second hash function h2(x); and (2) version identifiers (IDs). For example, in one embodiment, the version key may correspond to a concatenation of (A) and (B) (or vice versa). In other embodiments, the version key may be a value that is generated by applying some other function to (A) and (B). The version key in a given version table mapping identifies an "effective" bucket (i.e., a combination of first and second hash values computed via h1(x) and h2(x) respectively) that leads to an actual bucket ID in the second hash table per the steps described in workflow 400. For effective buckets where the second hash function h2(x) is not computed, the hash value for h2(x) can be represented by a null value in the version key.

In one set of embodiments, the versioned history table includes mappings between (1) history keys, each history key being a value derived from a version key and a version ID from the version table, and (2) server IDs for servers in the server group of a service. For example, in one embodiment, the history key may correspond to a concatenation of the version key and version ID (or vice versa). In other embodiments, the history key may be a value that is generated by applying some other function to the version key and the version ID. Each time a change is made to a particular {bucket ID→active server ID} mapping in the second hash table, the versioned history table can be updated with one or more new mappings for the effective buckets leading to that actual bucket ID, where the one or more new mappings (1) identify the server mapped to the bucket ID prior to the change, and (2) include, in their history keys, a version ID that is assigned based on a monotonically-increasing version number for the effective bucket. Thus, the versioned history table essentially maintains the previously-mapped server list for each effective bucket, and the servers in each such list is temporally ordered by version ID (with, for example, older servers having lower version IDs). Further, the version table is updated with new (or modified) mappings for the effective buckets leading to the actual bucket ID that include their current version IDs. Thus, the version table maintains the most current (e.g., highest) version ID recorded in the versioned history table for each effective bucket.

For example, assume a bucket B1 in the second hash table is remapped, for the first time, to point to server S3 from server S1. In this case, mappings will be created in the versioned history table for all effective buckets leading to actual bucket B1 that identify S1 as a previously-mapped server and that include, in the history key, an initial version ID value (e.g., v0). In addition, a mapping will be created in the version table that associates each effective bucket leading to actual bucket B1 with version ID v0.

Further assume that bucket B1 in the second hash table is subsequently remapped again to point to server S2 from server S3. In this case, mappings will be created in the versioned history table for the effective buckets leading to actual bucket B1 that identify S3 as a previously-mapped server and that include, in the history key, an incremented version ID (e.g., v1). In addition, the mapping for each effective bucket in the version table will be updated to identify new version ID v1.

With the foregoing in mind, starting at block 502 of FIG. 5A, network load balancer 102 can receive, from a client device 104, a network packet destined for service 112 (e.g., a packet sent to the VIP or VIP/port of service 112). In response, network load balancer 102 can use the dual hashes approach described in section (3.1) and shown in FIG. 4 to compute first and/or second hash values based on the packet's 5-tuple/header field combination (block 504), perform a lookup into the second hash (i.e., final lookup) table using the computed hash value(s) (block 506), identify a matching {bucket ID→active server ID} mapping in the second hash table (block 508), and determine the active server identified in the matched hash table mapping (block 510).

In addition, network load balancer 102 can use the first and/or second hash values computed at block 504 to perform a lookup into the version table (block 512), identify a matching {version key→version ID} mapping in the version table (block 514), and determine the version ID included in the matched version table mapping (block 516).

Network load balancer 102 can then encapsulate the packet with a header that includes the determined version ID (block 518), send the encapsulated packet to the active server 108 determined at block 510 (block 520), and check whether the packet is returned to the load balancer from that server (block 522).

If the encapsulated packet is not returned at block 522, network load balancer 102 can conclude that the server recognizes the network connection of the original un-encapsulated packet (or that the original packet is the initial packet of the connection) and thus the server will process it. Accordingly, no further action is needed on the part of network load balancer 102 and workflow 500 can end. As mentioned with respect to workflow 200, network load balancer 102 does not need to wait in a busy loop at block 522 to continuously check whether the network packet is returned; instead, network load balancer 102 can continue with its normal runtime operation and simply refrain from proceeding with the remainder of workflow 500 if the packet is not returned.

However, if the encapsulated packet is returned to network load balancer 102 at block 522, network load balancer 102 can conclude that the server does not recognize the original packet's network connection. In this case, workflow 500 can proceed to FIG. 5B, where network load balancer 102 can receive the encapsulated packet (block 524), de-capsulate it to extract the original un-encapsulated packet and the embedded version ID (block 526), compute first and/or second hash values for the original packet per the dual hashes approach (block 528), and perform a lookup into the load balancer's versioned history table using the computed hash value(s) and the version ID (blocks 530/532).

If the lookup into the versioned history table does not result in a match to a {history key→server ID} mapping at block 532, network load balancer 102 can conclude that the server which originally established the packet's network connection is no longer available, transmit a reset command to the originating client device (block 534), and terminate the workflow.

On the other hand, if the lookup into the versioned history table does result in a match to a particular {history key→server ID} mapping, network load balancer 102 can decrement the version ID by 1 (block 536), re-encapsulate the original packet with a header that includes the decremented version ID (block 538), transmit the encapsulated packet to the server identified in the matched versioned history table mapping (block 540), and return to block 522 of FIG. 5A. By decrementing the version ID at block 536 before including it the encapsulated packet, network load balancer 102 ensures that it will look for the next previously-mapped server in the versioned history table if the packet is returned again. The subsequent steps of the workflow can then repeat if needed until an end condition is reached (e.g., the packet is not returned to network load balancer 102 by a server or all previously-mapped servers are tried).

It should be appreciated that workflow 500 is illustrative and various modifications are possible. For example, although workflow 500 assumes that the version table and the versioned history table include mappings for a single service 112, in some embodiments network load balancer 102 may load balance traffic/connections for multiple services. In these cases, network load balancer 102 may maintain multiple sets of version and versioned history tables (one set per service), and select the appropriate set to use based on an identifier associated with each service (e.g., a service or server group ID). Alternatively, network load balancer 102 may maintain mappings of all of the services it handles in a single version table and a single versioned history table, and may employ an additional service ID or server group ID in the key fields of these respective tables in order to distinguish the mappings pertaining to each service.

Further, although workflow 500 assumes that the version ID for an effective bucket is incremented by 1 each time that effective bucket is remapped to a different active server (and the version ID extracted by network load balancer 102 is decremented by 1 at block 536), in some embodiments the version IDs can be increased or decreased according to different values, or modified in some other manner to indicate a change in versions.

Yet further, as suggested in section (2) above, in some embodiments network load balancer 102 may periodically age out previously-mapped servers from the versioned history table after some predefined age-out interval. In one set of embodiments, this age-out interval can be set at some value that exceeds the average or worst-case lifespan of a network connection, thereby avoiding situations where a previously-mapped server is prematurely removed from the versioned history table (e.g., before all connections established by that server have been terminated).

4. Resilient Hashing with Compression

Resilient hashing with compression is another improved resilient hashing scheme that, like resilient hashing with multiple hashes, is more space-efficient than conventional resilient hashing. However, rather than using multiple hierarchical hash tables/lookups, in certain embodiments this compression-based approach creates a single logical hash table with full replication as in conventional resilient hashing (i.e. a hash table with B {bucket ID→active server ID} mappings where B=maximum group size×R), and then physically stores this logical hash table in the form of two partitions: an uncompressed (i.e., "singles") partition and a compressed partition.

In one embodiment, each mapping in the singles partition is a {uncompressed index→active server ID} mapping that corresponds to a single {bucket ID→active server ID} mapping in the logical hash table. In other words, the uncompressed index in each singles partition mapping addresses a single bucket ID in the logical hash table.

In contrast, in one embodiment each mapping in the compressed partition is a {compressed index→active server ID} mapping that corresponds to multiple consecutive {bucket ID→active server ID} mappings in the logical hash table. In other words, the compressed index in each compressed partition mapping addresses a range of consecutive bucket IDs in the logical hash table. Thus, the compressed partition effectively compresses a portion of the mappings in the logical hash table into fewer mappings, thereby yielding memory savings. For example, if the logical hash table includes four mappings {bucket ID B1→active server ID S10}, {bucket ID B2→active server ID S10}, {bucket ID B3→active server ID S10}, {bucket ID B4→active server ID S10}, the compressed partition can represent these using a single mapping {compressed index CI1→active server ID S10}, where CI1 addresses the range [B1 . . . B4].

The size of the bucket ID range that is addressed by each compressed index is considered the compression factor C for the compressed partition. For instance, in the example above CI1 addresses four consecutive bucket IDs so C=4. It is assumed that the buckets that are mapped to the same active server ID in the logical hash table have consecutive bucket IDs, which can be enforced at the time of distributing servers to buckets in the logical hash table.

The purpose of the singles partition (which represents the uncompressed portion of the logical hash table) is to ensure that bucket IDs can be mapped to server IDs in a relatively even manner. To understand this, consider a conventional resilient hashing scenario where maximum group size=32, R=32, and N=31. In this case, there will be 1024 buckets in the hash table, 31 active servers will be mapped to 33 buckets each, and one active server will be mapped to 34 buckets. This means that the one active server with 34 buckets will receive approximately 3% more traffic than the other 30 active servers.

Now consider the scenario where the hash table above is represented using only a compressed partition (i.e., no singles partition) with, e.g., C=4. In this case, buckets can only be assigned to active servers in groups of 4 because a single compressed index will address 4 bucket IDs, and there will be a total of 256 {compressed index→active server ID} mappings. Accordingly, the most even distribution that can be achieved is that 23 active servers will be mapped to 8×4=32 buckets, and the remaining 8 active servers will be mapped to 9×4=36 buckets. This means that the 8 active servers with 36 buckets will receive approximately 12.5% more traffic than the other 23 active servers, which is a significantly higher percentage than in the conventional resilient hashing scenario.

By maintaining a portion of the hash table in uncompressed form via the singles partition, this problem can be avoided. For example, assume that the hash table above is divided into a singles partition comprising 128 {uncompressed index→active server ID} mappings (corresponding to 128 buckets in the hash table) and a compressed partition comprising 224 {compressed index→active server ID} mappings (corresponding to 224×4=896 buckets in the hash table). In this case, the most even distribution that can be achieved is that 30 active servers will be mapped to 8×4+1=33 buckets, and one active server will be mapped to 8×4+2=34 buckets. This means that the one active server with 34 buckets will receive approximately 3% more traffic than the other 30 active servers, which is the same delta as the conventional resilient hashing scenario.

With the compression-based approach described above, the benefits of resilient hashing can be achieved with significantly less memory usage. For example, assuming compression factor C=4 and replication factor R=32, resilient hashing with compression can require 2.9 times less memory than conventional resilient hashing. In addition, resilient hashing with compression can be efficiently implemented in hardware with a bit shifting technique (discussed in subsection (4.2) below) and can yield further memory savings when used in combination with versioned history-based connection-server affinity (discussed in subsection (4.3) below).

Generally speaking, the size of the singles partition does not need to be fixed; for example, it can be dynamically modified when the number of active servers N changes in order to achieve an optimal level of compression along with even distribution of buckets (e.g., a distribution where the bucket delta between any two active servers is no greater than 1). However, this dynamic modification will typically result in more total churn in mappings over embodiments where the size of the singles partition is fixed. In the implementations discussed in subsections (4.2) and (4.3), the singles partition is set to a fixed size for reasons explained below.

Like resilient hashing with multiple hashes, resilient hashing with compression is not tied to network load balancing and instead can be applied to any hashing context. Thus, the various steps attributed to a network load balancer in the following subsections can be performed by any network or computing device, and the references to "servers" and "server IDs" in the following subsections can be interchangeably replaced with "next hop destinations" and "next hop destination IDs."

4.1 High-Level Workflow

Figure 6:
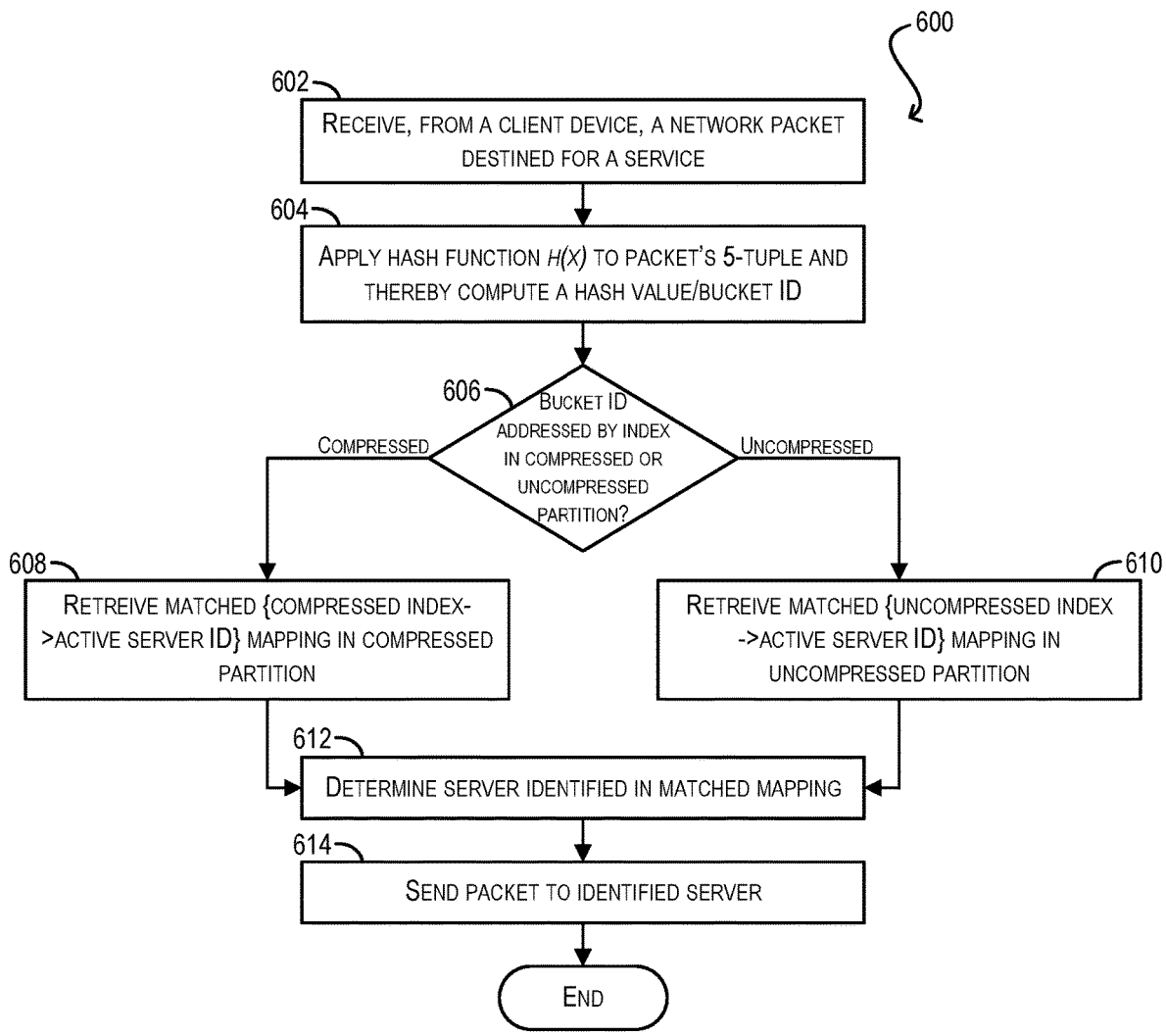
FIG. 6 depicts a workflow for implementing resilient hashing with compression according to an embodiment.

FIG. 6 depicts a high-level workflow 600 that can be performed by network load balancer 102 of FIG. 1 for implementing resilient hashing with compression according to an embodiment. This workflow assumes that network load balancer 102 maintains a logical hash table for service 112 in the form of a compressed partition and an uncompressed partition as indicated above.

At block 602, network load balancer 102 can receive a network packet from a client device 104 that is destined for the VIP or VIP/port of service 112. In response, network load balancer 102 can apply a hash function h(x) to the packet's 5-tuple (or other header field combination uniquely identifying the packet's network connection) and thereby compute a hash value corresponding to a bucket ID (block 604). In one set of embodiments, hash function h(x) used here may be the same hash function used in conventional resilient hashing as described in section (1) (i.e., k(x) modulo B, where B=maximum group size×R). In other embodiments, other types of hash functions may be used.

At block 606, network load balancer 102 can determine whether the computed bucket ID matches (i.e., is addressed by) a compressed index in the compressed partition or an uncompressed index in the uncompressed partition. Because the compressed and uncompressed partitions cover disjoint portions of the logical hash table's hash space in certain embodiments, the computed bucket ID will only match one of the two in these embodiments. The specific manner in which this determination is performed may differ depending on how the compressed indices are represented and mapped to the respective bucket ID ranges they address.

If the computed bucket ID is addressed by a compressed index at block 606, network load balancer 102 can retrieve the matched {compressed index→active server ID} mapping from the compressed partition (block 608). Alternatively, if the computed bucket ID is addressed by an uncompressed index at block 606, network load balancer 102 can retrieve the matched {uncompressed index→active server ID} mapping from the uncompressed partition (block 610). Finally, network load balancer can determine the active server identified in the matched mapping (block 612), send the packet to that active server (either in accordance with the history-based connection-server affinity workflow described in section (1) above or a conventional load balancing workflow) (block 614), and terminate workflow 600.

4.2 Hardware Implementation

Figure 7:
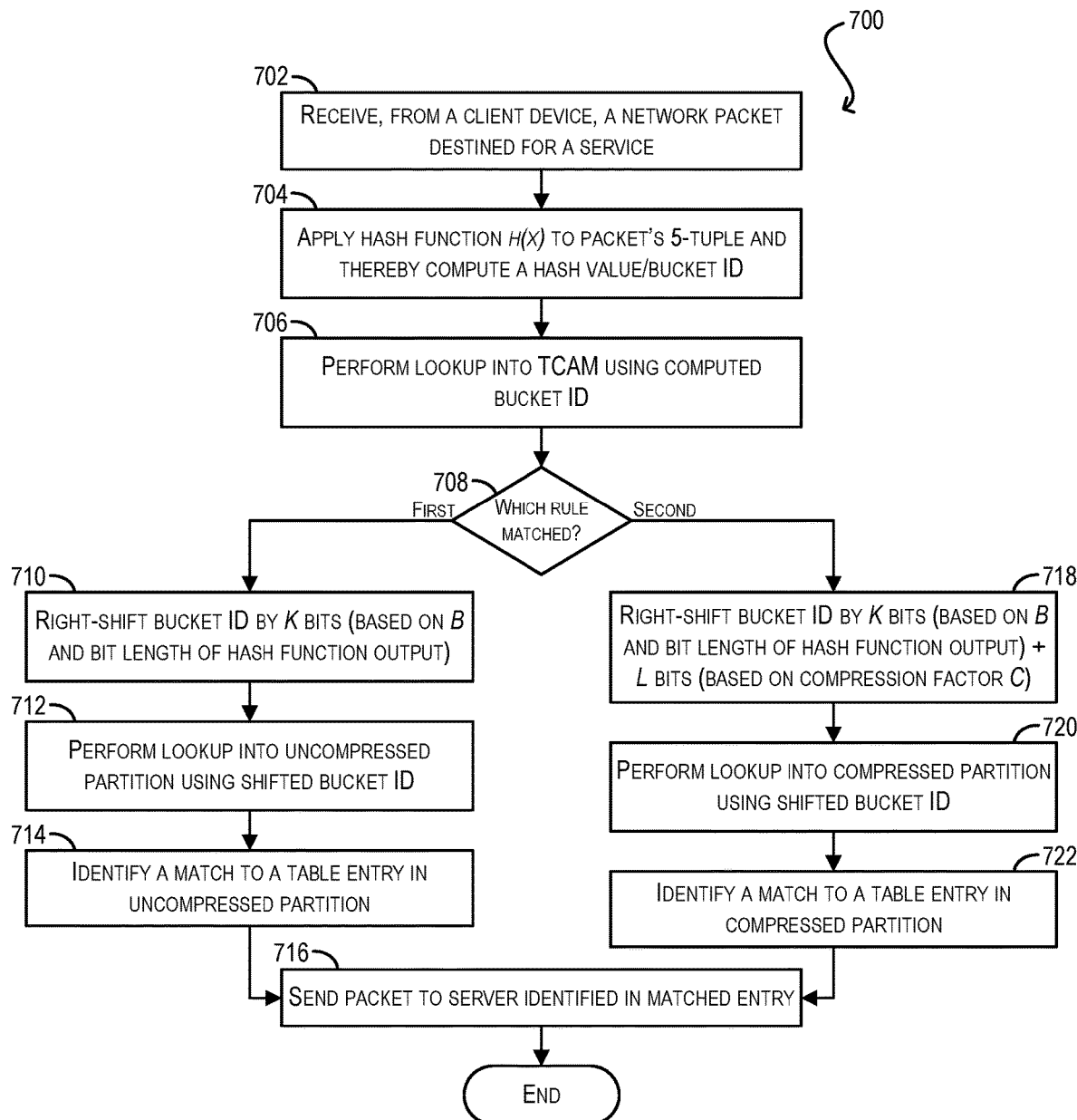
FIG. 7 depicts another workflow for implementing resilient hashing with compression according to an embodiment.

FIG. 7 depicts a workflow 700 that can be performed by network load balancer 102 for implementing resilient hashing with compression in hardware (e.g., in an ASIC) according to an embodiment.

Like workflow 600 of FIG. 6, workflow 700 assumes that network load balancer 102 maintains a logical hash table for service 112 in the form of a compressed partition and an uncompressed partition. Workflow 700 further assumes that (1) the compressed and uncompressed partitions are implemented as portions (e.g., disjoint sets of entries) of a single direct index table, where the indices of the direct index table correspond to the compressed and uncompressed indices of the respective partitions, (2) the compressed partition appears immediately before the uncompressed partition in the direct index table, and (3) the size of the singles partition is fixed at some predetermined value.

Figure 8:
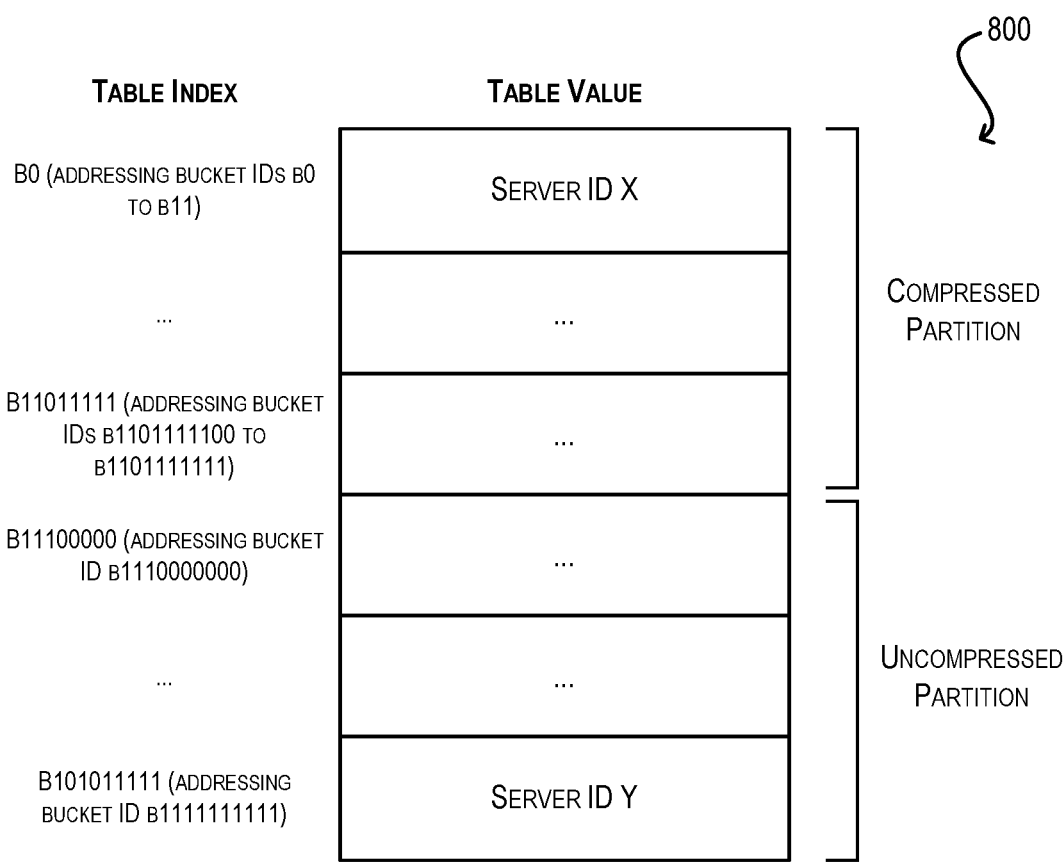
FIG. 8 depicts an example direct index table comprising a compressed partition and an uncompressed partition according to an embodiment.

By way of example, FIG. 8 depicts a representation of this direct index table (800) in the scenario where maximum group size=32, replication factor R=32, compression factor C=4, and the size of the singles partition=128. As shown in FIG. 8, the indices of the direct index table range, in binary, from b0 to b101011111 (0 to 351 in decimal). The table entries identified by indices b0 to b11011111 (0 to 223 in decimal) correspond to mappings in the compressed partition, and the table entries identified by indices b11100000 to b101011111 (224 to 351 in decimal) correspond to mappings in the uncompressed partition. Each table entry identifies an active server ID that is mapped to the corresponding table index.

Note that, for the table entries in the compressed partition, a single table index addresses four bucket IDs. Thus, for instance, table index b0 addresses bucket IDs b0-11. On the other hand, for the table entries in the uncompressed partition, a single table index addresses a single bucket ID. Thus, for instance, table index b11100000 addresses bucket ID b1110000000.

Further note that, due to the specific numbers used and the fact that the size of the singles partition is fixed, the three most significant bits of every table index in the uncompressed partition is "111." As discussed below, this property can be leveraged by network load balancer 102 to efficiently determine whether a given bucket ID is part of the compressed or uncompressed partition.

Returning now to FIG. 7, at blocks 702 and 704, network load balancer 102 can receive a client packet destined for service 112 and can apply a hash function k(x) to the packet's 5-tuple/header field combination, thereby computing a hash value corresponding to a bucket ID. In various embodiments, k(x) can be an existing checksum or hash function such as CRC-16, MD5, etc. For block 704, network load balancer 102 can use a hardware-based hash generation component that is configured to output the hash value as a bit string having a length of X bits. For example, if the hardware-based hash generation component is configured to implement CRC-16, the computed hash value/bucket ID will be a 16-bit value.

At blocks 706 and 708, network load balancer 102 can perform a lookup, using the computed bucket ID, into a ternary content addressable memory (TCAM) that is configured with two rules. The first TCAM rule has a search predicate that looks for a sequence of J 1 bits as the most significant bits of the data input to the TCAM. By using an appropriate value for J (which depends on the total number of buckets B and the fixed size of the singles partition), this search predicate can determine if the bucket ID is addressed by an entry in the uncompressed partition. For instance, as mentioned above, in the example of FIG. 8 all table entries in the uncompressed partition begin with sequence "111."

The second TCAM rule has a search predicate that doesn't care what the J most significant bits of the input data are. In various embodiments, this second rule is set to a lower priority than the first rule, which will cause any bucket ID that does not match the first rule to match the second rule.

If the first TCAM rule is matched in response to the TCAM lookup at blocks 706/708, the computed bucket ID is in the uncompressed partition. In this case, network load balancer 102 can right shift the computed bucket ID by a number of bits (e.g., K) in order to truncate the bucket ID (which has a length of X bits) to a value that has a length of B bits (block 710). Network load balancer 102 can then perform a lookup into the uncompressed partition of the direct index table using the shifted bucket ID (block 712), identify a match to a table entry in the uncompressed partition (block 714), send the packet to the active server identified by the active server ID in the matched table entry (block 716), and end the workflow.

However, if the second TCAM rule is matched in response to the TCAM lookup at blocks 706/708, the computed bucket ID is in the compressed partition. In this case, network load balancer 102 can right shift the computed bucket ID by K as in the uncompressed case, but also by an additional L bits which correspond to compression factor C (block 718). For example, if C=4, L will be 2 bits. This additional right shift by L bits allows the network load balancer 102 to reference the correct compressed index in the table. Network load balancer 102 can then perform a lookup into the compressed partition of the direct index table using the shifted bucket ID (block 720), identify a match to a table entry in the compressed partition (block 722), send the packet to the active server identified by the active server ID in the matched table entry (block 716), and end the workflow.

While workflow 700 of FIG. 7 and the example of FIG. 8 suggest that network load balancer 102's direct index table includes compressed and uncompressed partitions for only a single service (e.g., service 112), in some embodiments this table may include compressed/uncompressed partitions for multiple services. In these embodiments, the per-service compressed/uncompressed partitions can be laid out sequentially in the direct index table and network load balancer 102 can keep track of a service offset for each service that identifies where the compressed partition for that service starts in the table. Network load balancer 102 can then apply this service offset when performing its bitwise operations in workflow 700 to ensure that it is operating on the table entries of the correct service.

4.3 Versioned History-Based Connection-Server Affinity Using Resilient Hashing with Compression Like resilient hashing with multiple hashes, in certain embodiments network load balancer 102 can implement versioned history-based connection-server affinity (i.e., history-based connection-server affinity using a version table and versioned history table) in combination with compression-based resilient hashing. The implementation of this is largely similar to workflow 500 of FIGS. 5A/5B and the details described in section (3.3) above, with the main points of distinction being that (1) in workflow 500, blocks 504-510 and 528 (i.e., the steps where hashing and active server selection are performed) can be replaced with blocks 704-722 of workflow 700; and (2) in the version key(s) of the version table and the history key(s) of the versioned history table, the value derived from the first and second hash values can be replaced with the shifted bucket ID generated at block 710 or 718 of workflow 700.

One advantage of using the compression-based approach over the multiple hashes approach for implementing versioned history-based connection-server affinity is that the size of the versioned history table will generally be smaller with the compression-based approach. This is due to at least two reasons. First, in various embodiments of the multiple hashes approach, when a server S is changed from inactive status in active status, all of the effective bucket combinations corresponding to (first hash value=S, second hash value=*) require new entries in the versioned history table to identify the previously-mapped server(s) for those effective buckets. This can cause the versioned history table to grow quickly, particularly if the number of buckets in the final lookup table is large.

Second, since the compression-based approach makes use of compressed indices/bucket IDs for entries in the compressed partition, the history entries in the versioned history table (which are keyed on bucket ID) are also effectively compressed. This compression in the versioned history table can break down if one or more bucket IDs "move" between the compressed and uncompressed partitions (i.e., change from being addressed by a compressed index in the compressed partition to an uncompressed index in the uncompressed partition or vice versa), which is one reason why the size of the singles partition is fixed in the hardware implementation of FIG. 7.

5. History Deduplication

In scenarios where a large percentage of the active servers for a service are removed from and subsequently re-added to the service's server group within a short time window (e.g., a server upgrade scenario that involves upgrading every active server in the server group), the history information maintained by network load balancer 102 can grow to a fairly large size, with multiple server repetitions in the prior-mapped server list for each hash table bucket. For example, the prior-mapped server list for a bucket B1 may comprise the following chain of servers, ordered from oldest to newest: S1→S2→S3→S1→S3→S4. In this example, servers S1 and S3 are each repeated twice. However, in order to achieve connection-server affinity (i.e., ensuring that a packet reaches the server where the packet's network connection was established), network load balancer 102 does not need to try sending a packet to a previously-mapped server more than once, and therefore does not need to maintain duplicate previously-mapped server entries for a given bucket.

Accordingly, in certain embodiments network load balancer 102 can implement a deduplication process that involves periodically scanning the per-bucket server lists in the history information and removing the duplicate servers in each list. Thus, in the example above, the deduplication process can trim the list for bucket B1 from S1→S2→S3→S1→S3→S4 to S1→S2→S3→S4, thereby reducing the amount of memory need to maintain this information.

The specific manner in which this deduplication is implemented will depend on how the history information is physically represented/stored on the network load balancer. In some implementations, the deduplication process may cause the network load balancer to begin its history-based connection-server affinity processing from a previously-mapped server that is not the most recent previously-mapped server for a bucket; however, since deduplication reduces the total length of the bucket's server list and older server entries are automatically aged-out, this should not pose a significant issue in most deployments.

In the versioned history-based connection-server affinity implementation described above, if a server is removed from the middle of a previously-mapped server chain, the version ID sequence for the chain will be broken. To address this problem, the network load balancer can replace a server that is removed from the middle of a chain with another instance of the server located at the chain's tail. For example, if the chain for bucket B1 comprises S1 (v0)→S2 (v1)→S3 (v3) →S4 (v4) and S3 (v3) is removed, the S3 entry can be replaced with S1 (v3) to keep the version ID sequence intact.

With this solution, the duplicate tail entry S1 (v0) can be kept in the chain for some timeout interval in order to account for in-flight instances of workflow 200 that have already passed removed entry S3 (v3). In a particular embodiment, the length of this timeout interval can be set to (version of the removed entry)−(version of the tail entry)×3, wherein 3 is a constant used to simulate the typical round-trip time (RTT) of a packet between the network load balancer and a server. The tail entry can be removed from the chain upon expiration of this timeout interval.

6. Deterministic Hash Table Distribution

In resilient hashing and its variants, there is a need to distribute hash table buckets to active servers in order to initially populate the hash table of {bucket ID→active server ID} mappings, as well as to update the hash table when an active server is added or removed. Since the total number of buckets B will generally be larger than the number of active servers N, the goal of this process is to distribute buckets to active servers in a balanced fashion, such that each active server is mapped to approximately the same number of buckets.

A straightforward way to perform this distribution is as follows:

1. For the first active server S1 added to the server group of a service, map all hash table buckets to S1
2. For the second active server S2 added to the server group, take one half of the buckets mapped to S1 and remap those to S2
3. For the third active server S3 added to the server group, take one third of the buckets mapped to S1 and S2 respectively and remap those to S3
4. Continue in a similar fashion for every additional active server However, the algorithm above results in a set of {bucket ID→active server ID} mappings that is non-deterministic—in other words, the set of mappings will differ depending on the order in which the entity performing the distribution (e.g., a network load balancer) sees the active servers being added. This is problematic in deployments that use multiple network load balancers connected to the same server group for availability or redundancy, because in these deployments each load balancer may see the servers being added in a slightly different order (due to, e.g., network delays or other reasons) but it is important that all of the load balancers calculate the same {bucket ID→active server ID} mappings in order to load balance connections consistently across the server group.

Figure 9A:
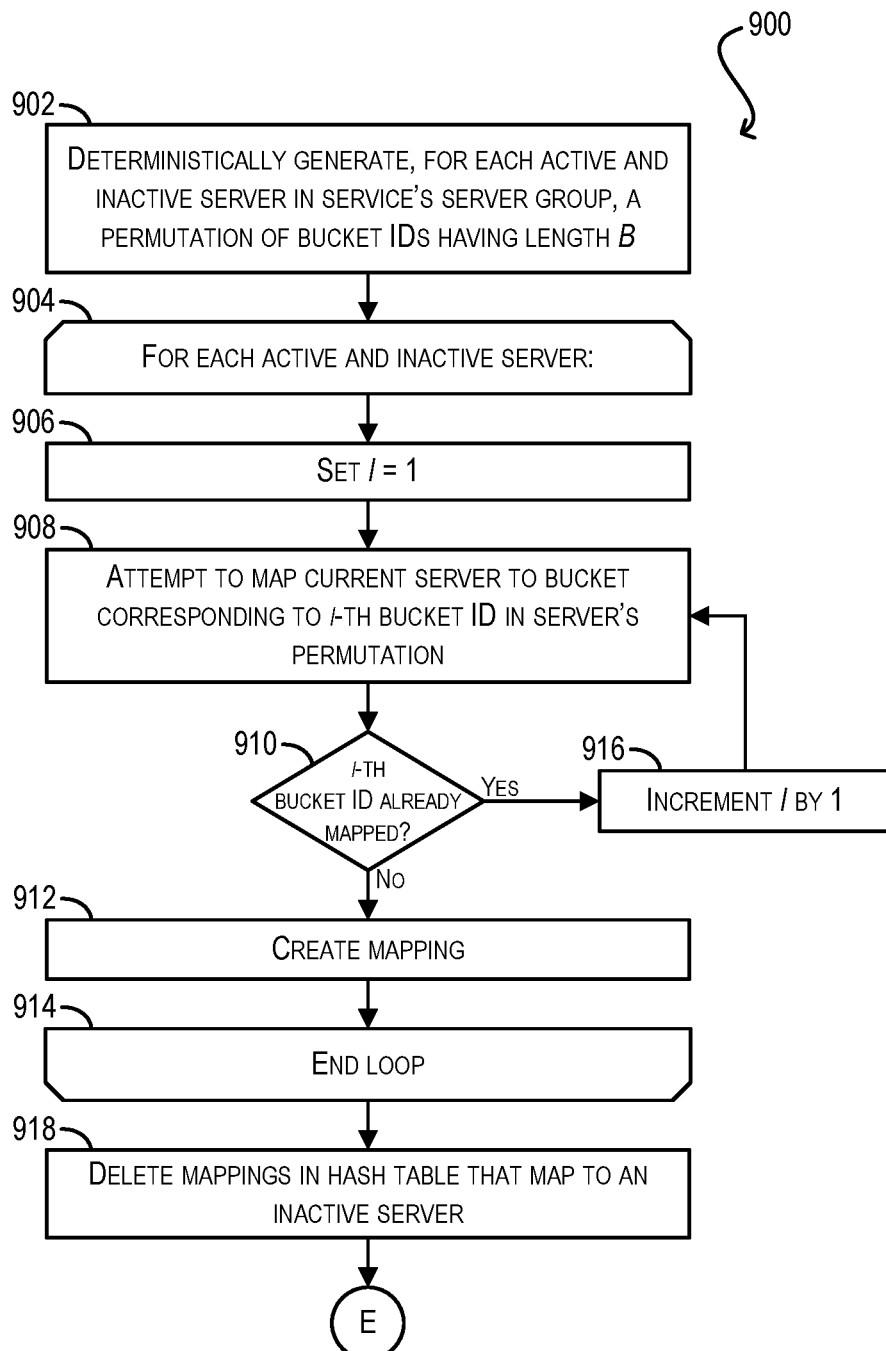
FIGS. 9A and 9B depict a workflow for implementing deterministic hash table distribution according to an embodiment.
Figure 9B:
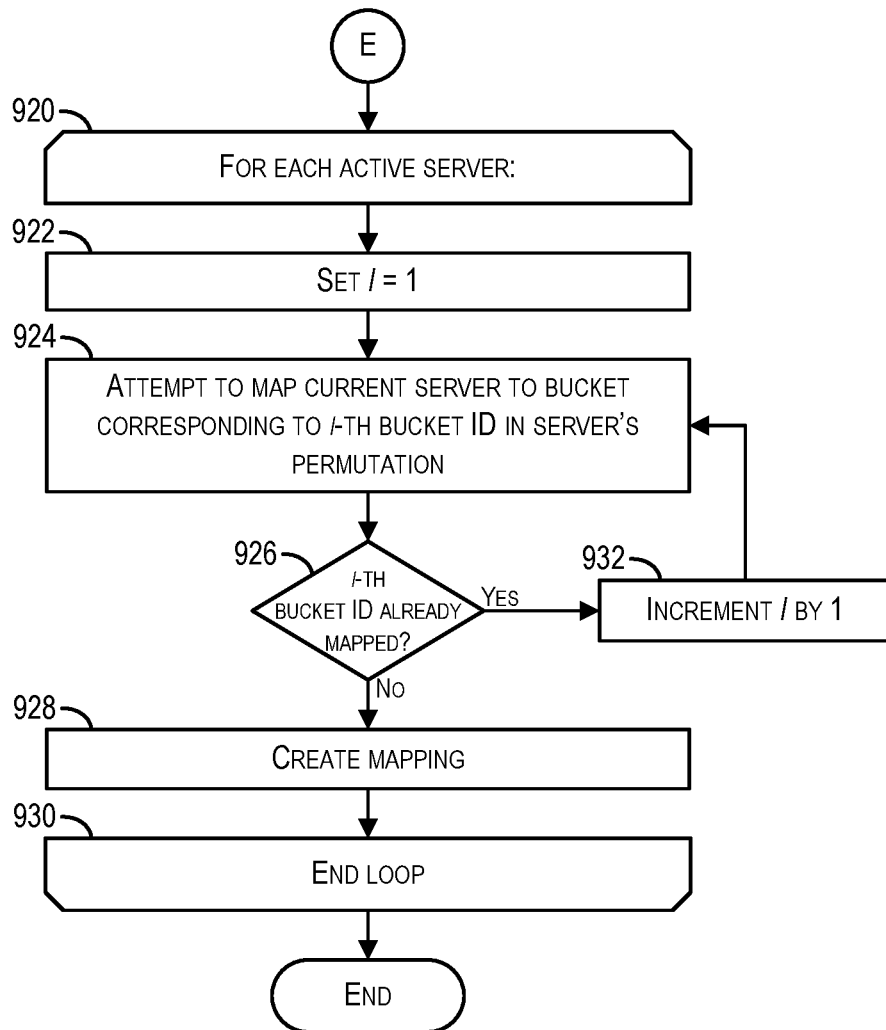

To address the foregoing and other problems, FIGS. 9A and 9B depict a workflow 900 that can be performed by network load balancer 102 to distribute active servers to hash table buckets for a service (e.g., service 112) in a deterministic manner according to an embodiment. This approach will always yield the same set of {bucket ID→active server ID} mappings, regardless of the order in which active servers are added to service 112's server group. In addition, this approach advantageously minimizes the number of existing mappings that need to be changed when an active server is added or removed.

Starting with block 902 of FIG. 9A, network load balancer 102 can generate, for each active and inactive server in the server group for service 112, a permutation of bucket IDs having length B, where every possible bucket ID in the range [0 . . . B−1] (or [1 . . . B]) is included exactly once in the permutation and where the permutations are generated using a deterministic algorithm. For example, if B=4 and there are two servers S1 and S2 in the server group, the permutation generated for S1 may be [1, 3, 0, 2] and the permutation generated for S2 may be [0, 1, 2, 3].

In a particular embodiment, each permutation can be generated using the following Python code, which supports hash tables having a size (i.e., number of buckets B) that is a power of 2 or a non-prime number:

For i in xrange(hashTableSize):
  p_append((prime*i)) % hashTableSize)

In this code segment, hashTableSize is equivalent to B, prime is a prime number that is different for each active server, and hashTableSize and prime are coprime.

At block 904, network load balancer 102 can enter a first loop that involves traversing in a round-robin manner through the active and inactive servers in the server group. Within this first loop, network load balancer 102 can initialize a loop variable i to 1 (block 906) and attempt to map the current server to the bucket corresponding to the i-th bucket ID in the server's permutation (blocks 908/910). If the i-th bucket is not already mapped to a server at block 910, a mapping between the i-th bucket and the current server will be created in the hash table (block 912) and the end of the first loop will be reached (block 914). However, if the i-th bucket is already mapped to a server at block 910, network load balancer 102 can increment i by 1 (block 916) and return to block 908 in order to try mapping the next (i.e., i+1) bucket ID in the permutation. This will continue until the current server is mapped to some bucket ID in its permutation.

At the conclusion of the first loop, every bucket in the hash table will be mapped to a server (either active or inactive) in the server group of service 112. At this point, network load balancer 102 can delete all of the mappings in the hash table that specifically identify an inactive server (block 918). Network load balancer 102 can then proceed to FIG. 9B and enter a second loop 920 that involves traversing in a round-robin manner through only the active servers in the server group.

Within this second loop, network load balancer 102 can perform a similar set of actions as the first loop. In particular, network load balancer 102 can initialize a loop variable i to 1 (block 922) and attempt to map the current active server to the bucket corresponding to the i-th bucket ID in the server's permutation (blocks 924/926). If the i-th bucket is not already mapped to a server at block 926, a mapping between the i-th bucket and the current active server will be created in the hash table (block 928) and the end of the second loop will be reached (block 930). However, if the i-th bucket is already mapped to a server at block 926, network load balancer 102 can increment i (block 932) and return to block 924 in order to try mapping the next (i.e., i+1) bucket ID in the permutation. This will continue until the current active server is mapped to some bucket ID in its permutation.

At the conclusion of this second loop, every bucket in the hash table will be mapped to an active server in the server group of service 112. Workflow 900 can then end. Because of the way in which this algorithm populates the hash table with both active and inactive servers in the first loop and then remaps the inactive server mappings to active servers in the second loop, this algorithm reduces the amount of churn in the hash table when an active server is removed or a new active server is added. For example, if an active server S1 is changed from active to inactive status, the network load balancer only needs to delete the mappings that point to S1 and re-execute the second loop, which keeps the other existing mappings in the hash table intact.

In the context of the multiple hashes approach for resilient hashing described in section (3) above, workflow 900 can be applied to distribute active servers to bucket IDs in the final lookup table. In the context of the compression-based approach for resilient hashing described in section (4) above, workflow 900 can be applied to first populate the compressed partition, and then to populate the singles partition (taking into account which active servers, if any, received fewer compressed entries in the compressed partition than others).

7. Example Network Device

Figure 10:
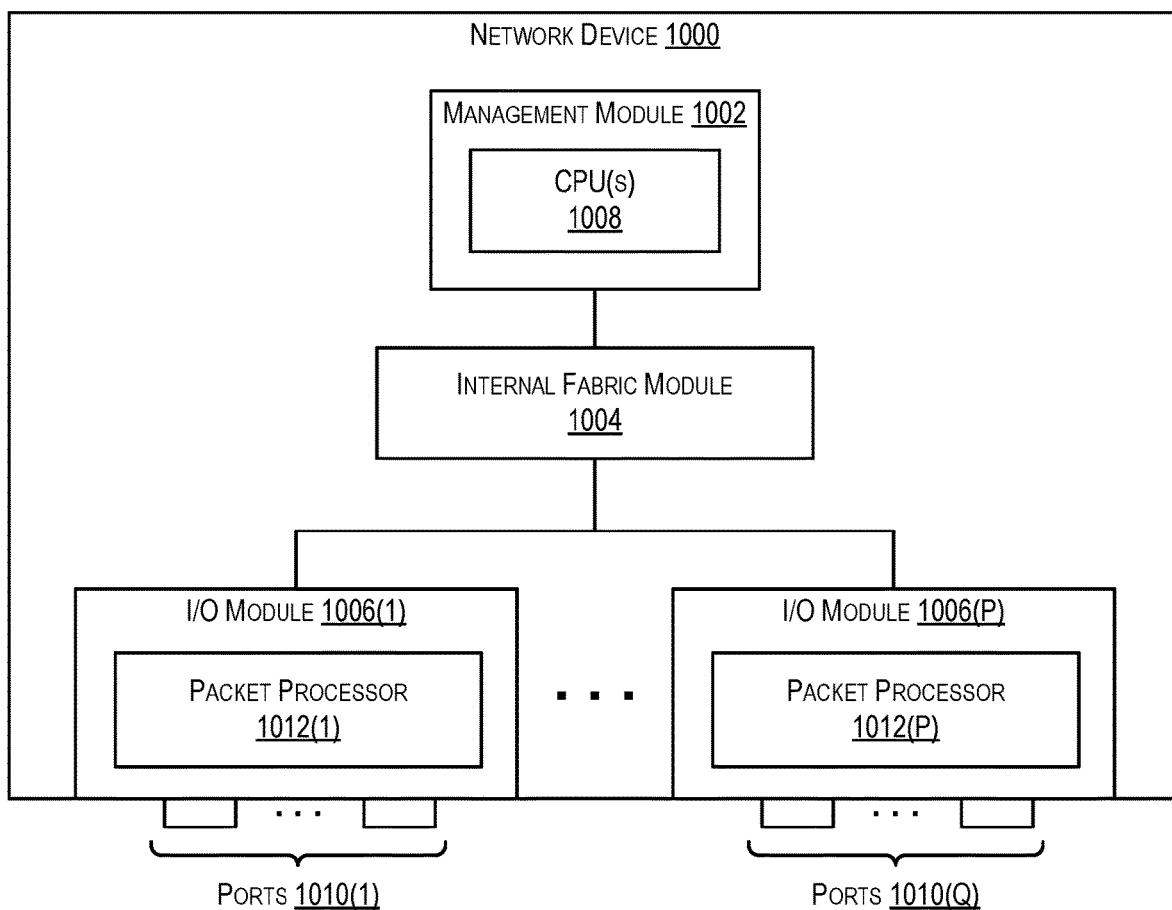
FIG. 10 depicts an example network device according to an embodiment.

FIG. 10 depicts an example network device (e.g., a network switch and/or router) 1000 that may be used to implement a hardware-based version of network load balancer 102 of FIG. 1 in certain embodiments—in other words, a version of network load balancer 102 that is implemented, at least in part, via one or more ASICs and/or other hardware processing elements.

As shown, network device 1000 includes a management module 1002, an internal fabric module 1004, and a number of I/O modules 1006(1)-1006(P). Management module 1002 includes one or more management CPUs 1008 for managing/controlling the operation of the device. Each management CPU 1008 can be a general purpose processor, such as an Intel/AMD x86 or ARM-based processor, that operates under the control of software stored in an associated memory (not shown).

Internal fabric module 1004 and I/O modules 1006(1)-1006(P) collectively represent the data, or forwarding, plane of network device 1000. Internal fabric module 1004 is configured to interconnect the various other modules of network device 1000. Each I/O module 1006(1)-1006(P) includes one or more input/output ports 1010(1)-1010(Q) that are used by network device 1000 to send and receive network packets. Each I/O module 1006(1)-1006(P) can also include a packet processor 1012(1)-1012(P). Packet processor 1012(1)-1012(P) is a hardware processing component (e.g., an ASIC) that can make wire speed decisions on how to handle incoming or outgoing network packets. In certain embodiments, one or more of the techniques described in the present disclosure may be implemented wholly, or in part, within packet processors 1012(1)-1012(P).

It should be appreciated that network device 1000 is illustrative and many other configurations having more or fewer components than network device 1000 are possible.

8. Example Computer System

Figure 11:
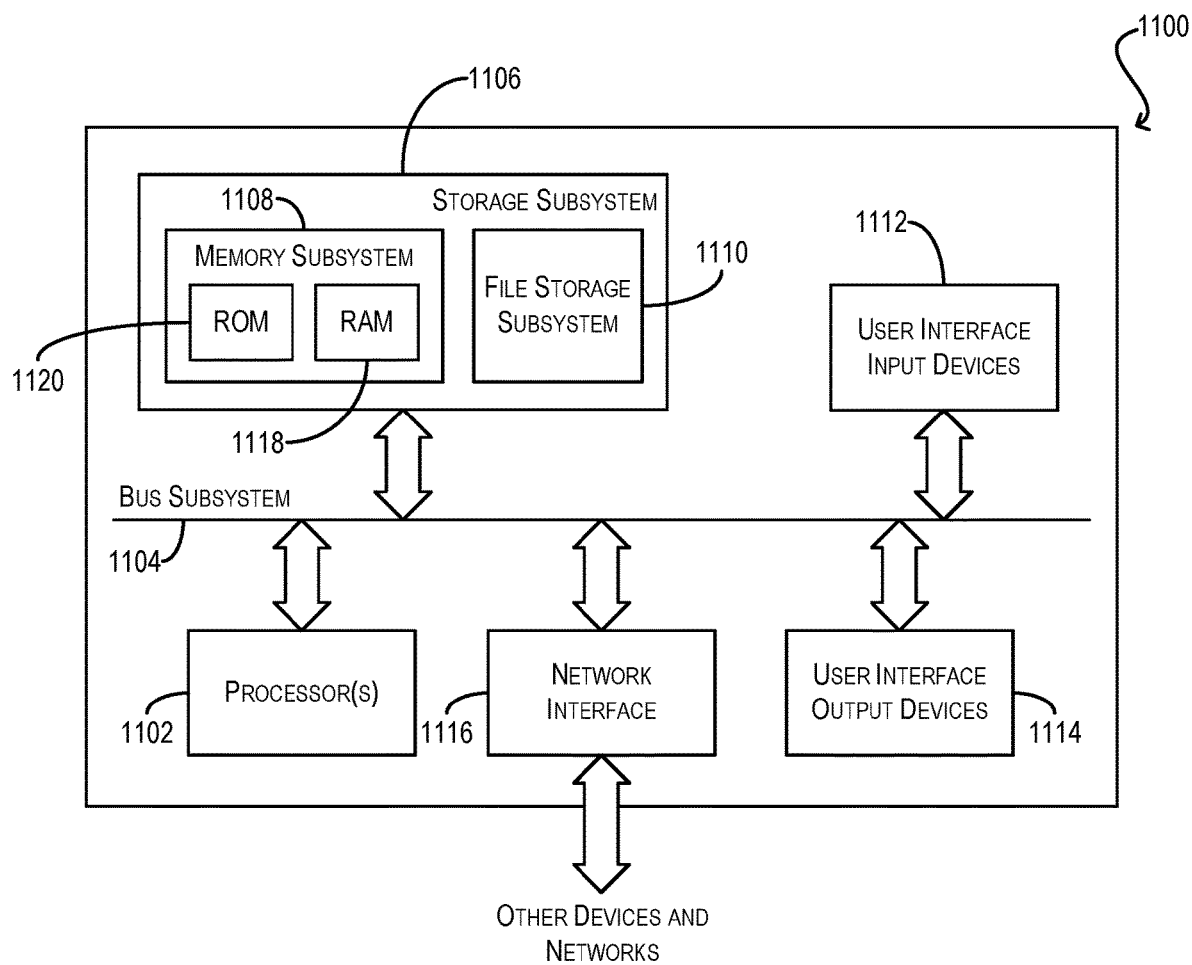
FIG. 11 depicts an example computer system according to an embodiment.

FIG. 11 depicts an example computer system 1100 that may be used to run a software-based version of network load balancer 102 of FIG. 1 in certain embodiments—in other words, a version of network load balancer 102 that is embodied in program code executable by a general purpose central processing unit (CPU).

As shown in FIG. 11, computer system 1100 includes one or more CPUs 1102 that communicate with a number of peripheral devices via a bus subsystem 1104. These peripheral devices include a storage subsystem 1106 (comprising a memory subsystem 1108 and a file storage subsystem 1110), user interface input devices 1112, user interface output devices 1114, and a network interface subsystem 1116.

Bus subsystem 1104 provides a mechanism for letting the various components and subsystems of computer system 1100 communicate with each other as intended. Although bus subsystem 1104 is shown schematically as a single bus, alternative embodiments of the bus subsystem can utilize multiple buses.

Network interface subsystem 1116 serves as an interface for communicating data between computer system 1100 and other computing devices or networks. Embodiments of network interface subsystem 1116 can include wired (e.g., coaxial, twisted pair, or fiber optic) and/or wireless (e.g., Wi-Fi, cellular, Bluetooth, etc.) interfaces.

User interface input devices 1112 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 1100.

User interface output devices 1114 can include a display subsystem such as a flat-panel display or non-visual displays such as audio output devices, etc. In general, use of the term "output device" is intended to include all possible types of devices and mechanisms for outputting information from computer system 1100.

Storage subsystem 1106 includes a memory subsystem 1108 and a file/disk storage subsystem 1110. Subsystems 1108 and 1110 represent non-transitory computer-readable storage media that can store program code and/or data that provide the functionality of various embodiments described herein.

Memory subsystem 1108 includes a number of memories including a main random access memory (RAM) 1118 for storage of instructions and data during program execution and a read-only memory (ROM) 1120 in which fixed instructions are stored. File storage subsystem 1110 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and many other configurations having more or fewer components than computer system 1100 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method of packet forwarding comprising:
   maintaining, by a network device, a first hash table comprising mappings between a first set of hash indices and a set of bit values, wherein for each mapping in the first hash table:
   the mapping's hash index corresponds to one of a group of next-hop destinations to which network packets received by the network device may be transmitted, and
   the mapping's bit value indicates whether the mapping's hash index corresponds to an active or inactive next-hop destination;
   maintaining, by the network device, a second hash table comprising mappings between a second set of hash indices and active next-hop destinations in the group of next-hop destinations;
   receiving, by the network device, a network packet;
   computing, by the network device, a first hash value using a portion of the network packet and a first hash function;
   matching, by the network device, the first hash value to a first mapping in the first hash table based on the first mapping's hash index; and
   when the first mapping's bit value indicates that the first mapping's hash index corresponds to an active next-hop destination:
      matching, by the network device, the first hash value to a second mapping in the second hash table based on the second mapping's hash index; and
      sending, by the network device, the network packet to the second mapping's active next-hop destination.

2. The method of claim 1 further comprising, when the first mapping's bit value indicates that the first mapping's hash index corresponds to an inactive next-hop destination:
   computing a second hash value using the portion of the network packet and a second hash function that is different from the first hash function;
   matching the second hash value to a third mapping in the second hash table based on the third mapping's hash index; and
   sending the network packet to the third mapping's active next-hop destination.

3. The method of claim 1 further comprising:
   maintaining a third hash table comprising mappings that are identical to the first hash table; and
   when the first mapping's bit value indicates that the first mapping's hash index corresponds to an inactive next-hop destination:
      computing a second hash value using the portion of the network packet and a second hash function that is different from the first hash function;
      matching the second hash value to a third mapping in the third hash table based on the third mapping's hash index; and
      when the third mapping's bit value indicates that the third mapping's hash index corresponds to an active next-hop destination:
         matching the second hash value to a fourth mapping in the second hash table based on the fourth mapping's hash index; and
         sending the network packet to the fourth mapping's active next-hop destination.

4. The method of claim 3 further comprising, when the third mapping's bit value indicates that the third mapping's hash index corresponds to an inactive next-hop destination:
   computing a third hash value using the portion of the network packet and a third hash function that is different from the first hash function and the second hash function;
   matching the third hash value to a fifth mapping in the second hash table based on the fifth mapping's hash index; and
   sending the network packet to the fifth mapping's active next-hop destination.

5. The method of claim 1 wherein a size of the first hash table is equal to a maximum group size for the group of next-hop destinations.

6. The method of claim 5 wherein the maximum group size is defined in a user-configurable file maintained on the network device.

7. The method of claim 6 wherein the user-configurable file further defines:
   which next-hop destinations in the group of next-hop destinations are active; and
   which next-hop destinations in the group of next-hop destinations are inactive.

8. The method of claim 5 wherein computing the first hash value comprises:
   extracting a 5-tuple from the network packet including the network packet's source Internet Protocol (IP) address, source port, destination IP address, destination port, and protocol;
   applying the 5-tuple to the first hash function to generate an intermediate hash value; and
   computing the intermediate hash value modulo the maximum group size to generate the first hash value.

9. The method of claim 5 wherein a size of the second hash table is equal to the maximum group size multiplied by a replication factor.

10. The method of claim 9 wherein computing the second hash value comprises:
    extracting a 5-tuple from the network packet including the network packet's source Internet Protocol (IP) address, source port, destination IP address, destination port, and protocol;
    applying the 5-tuple to the second hash function to generate an intermediate hash value; and
    computing the intermediate hash value modulo (the maximum group size multiplied by the replication factor) to generate the second hash value.

11. A network device comprising:
    a processor configured to:
       maintain a first hash table comprising mappings between a first set of hash indices and a set of bit values, wherein for each mapping in the first hash table:
          the mapping's hash index corresponds to one of a group of next-hop destinations to which network packets received by the network device may be transmitted, and
          the mapping's bit value indicates whether the mapping's hash index corresponds to an active or inactive next-hop destination;

maintain a second hash table comprising mappings between a second set of hash indices and active next-hop destinations in the group of next-hop destinations;
receive a network packet;
compute a first hash value using a portion of the network packet and a first hash function;
match the first hash value to a first mapping in the first hash table based on the first mapping's hash index; and
when the first mapping's bit value indicates that the first mapping's hash index corresponds to an active next-hop destination:
   match the first hash value to a second mapping in the second hash table based on the second mapping's hash index; and
   send the network packet to the second mapping's active next-hop destination.

12. The network device of claim 11 wherein when the first mapping's bit value indicates that the first mapping's hash index corresponds to an inactive next-hop destination, the processor is further configured to:
compute a second hash value using the portion of the network packet and a second hash function that is different from the first hash function;
match the second hash value to a third mapping in the second hash table based on the third mapping's hash index; and
send the network packet to the third mapping's active next-hop destination.

13. The network device of claim 11 wherein the processor comprises an application-specific integrated circuit (ASIC).

14. The network device of claim 11 wherein the processor comprises a general purpose central processing unit (CPU).

15. The network device of claim 13 wherein the first hash table is implemented as a bit vector stored on the ASIC.

16. The network device of claim 13 wherein the second hash table is implemented as a direct index table stored on the ASIC.

17. A non-transitory computer readable storage medium having stored thereon program code executable by a network device, the program code comprising:
code that causes the network device to maintain a first hash table comprising mappings between a first set of hash indices and a set of bit values, wherein for each mapping in the first hash table:
   the mapping's hash index corresponds to one of a group of next-hop destinations to which network packets received by the network device may be transmitted, and
   the mapping's bit value indicates whether the mapping's hash index corresponds to an active or inactive next-hop destination;
code that causes the network device to maintain a second hash table comprising mappings between a second set of hash indices and active next-hop destinations in the group of next-hop destinations;
code that causes the network device to receive a network packet;
code that causes the network device to compute a first hash value using a portion of the network packet and a first hash function;
code that causes the network device to match the first hash value to a first mapping in the first hash table based on the first mapping's hash index; and
when the first mapping's bit value indicates that the first mapping's hash index corresponds to an active next-hop destination:
   code that causes the network device to match the first hash value to a second mapping in the second hash table based on the second mapping's hash index; and
   code that causes the network device to send the network packet to the second mapping's active next-hop destination.

18. The non-transitory computer readable storage medium of claim 17 wherein the group of next-hop destinations correspond to a plurality of servers associated with a service,
wherein the network device is a network load balancer configured to load balance, among the plurality of servers, network traffic destined for the service; and
wherein the program code further comprises:
code that causes the network device to maintain a version table comprising mappings between version keys and version identifiers; and
code that causes the network device to maintain a history table comprising mappings between history keys and active next-hop destinations in the group of next-hop destinations.

19. The non-transitory computer readable storage medium of claim 18 wherein the program code further comprises, prior to transmitting the network packet to the third mapping's active next-hop destination:
code that causes the network device to combine the first hash value and the second hash value into a version key for the network packet; and
code that causes the network device to match the version key for the network packet to a fourth mapping in the version table based on the fourth mapping's version key, and
wherein the code that causes the network device to send the network packet to the third mapping's active next-hop destination comprises:
code that causes the network device to encapsulate the network packet with a header that includes the fourth mapping's version identifier; and
code that causes the network device to transmit the encapsulated network packet to the third mapping's active next-hop destination.

20. The non-transitory computer readable storage medium of claim 19 wherein the program code further comprises:
code that causes the network device to receive the encapsulated network packet back from the third mapping's active next-hop destination;
code that causes the network device to de-capsulate the network packet from the encapsulated network packet, the de-capsulating including extracting the fourth mapping's version identifier from the header;
code that causes the network device to compute a third hash value based on a portion of the de-capsulated network packet and the first hash function;
code that causes the network device to compute a fourth hash value based on the portion of the de-capsulated network packet and the second hash function;
code that causes the network device to combine the third hash value, the fourth hash value, and the extracted version identifier into a history key for the de-capsulated network packet; and
when the history key for the de-capsulated network packet matches a fifth mapping in the history table based on the fifth mapping's history key:
   code that causes the network device to modify the extracted version identifier for future processing;

code that causes the network device to re-encapsulate the de-capsulated network packet with another header that includes the modified version identifier; and code that causes the network device to transmit the re-encapsulated network packet to the fifth mapping's active next-hop destination.

* * * * *